US010159337B2

(12) United States Patent
Abernethy et al.

(10) Patent No.: US 10,159,337 B2
(45) Date of Patent: Dec. 25, 2018

(54) ACCESSORY CART

(71) Applicant: Humanscale Corporation, New York, NY (US)

(72) Inventors: Jane Abernethy, Brooklyn, NY (US); Robert Volek, Brooklyn, NY (US); Mesve Vardar, New York, NY (US); Lachezar Tsvetanov, Brooklyn, NY (US); Robert R. King, Elverson, PA (US); David Johnston, Robinsonville, NJ (US); Alexandra Burn, New York, NY (US); Xin Wang, Burlingame, CA (US); Jonathan Philip Puleio, Forest Hills, NY (US)

(73) Assignee: Humanscale Corporation, New York, NY (US)

( * ) Notice: Subject to any disclaimer, the term of this patent is extended or adjusted under 35 U.S.C. 154(b) by 0 days.

(21) Appl. No.: 15/706,139

(22) Filed: Sep. 15, 2017

(65) Prior Publication Data

US 2018/0020826 A1    Jan. 25, 2018

Related U.S. Application Data

(63) Continuation of application No. 14/714,994, filed on May 18, 2015, now Pat. No. 9,775,431, which is a
(Continued)

(51) Int. Cl.
*B60G 17/00* (2006.01)
*A47B 21/04* (2006.01)
(Continued)

(52) U.S. Cl.
CPC .............. *A47B 21/04* (2013.01); *A47B 21/02* (2013.01); *A61G 12/001* (2013.01); *B62B 3/001* (2013.01);
(Continued)

(58) Field of Classification Search
CPC ........... B62B 3/02; B62B 3/001; B62B 3/008; B62B 5/0043; B62B 3/002; B62B 3/10;
(Continued)

(56) References Cited

U.S. PATENT DOCUMENTS 2,685,487 A    8/1954 Wolter
2,795,473 A    6/1957 Smith
(Continued)

FOREIGN PATENT DOCUMENTS

DE    19540055 C1    6/1996
DE    19540058 C1    6/1996
(Continued)

OTHER PUBLICATIONS

Screenshot of webpage retrieved on Nov. 3, 2014 from http://www.youtube.com/watch?v=Q0hTjlBgei0.SPEEDKAR99. "Ergotables Automatic Height Adjustment System." The publication date is unknown, but is possibly as early as Apr. 16, 2010 based on the fact that the youtube webpage says "Uploaded on Apr 16, 2010."
(Continued)

*Primary Examiner* — Toan C To
(74) *Attorney, Agent, or Firm* — Jones Walker LLP

(57) ABSTRACT

In the specification and drawings an accessory cart is described and shown with a base, a housing element that is connected to the base and extends upward from the base, and a platform, which is connected to the housing element with the height of the platform being automatically adjustable.

27 Claims, 33 Drawing Sheets

Related U.S. Application Data continuation of application No. 13/763,395, filed on Feb. 8, 2013, now Pat. No. 9,039,016.

(60) Provisional application No. 61/596,635, filed on Feb. 8, 2012.

(51) Int. Cl.

| | | |
|---|---|---|
| *B62B 3/02* | (2006.01) | |
| *A61G 12/00* | (2006.01) | |
| *B62B 3/00* | (2006.01) | |
| *F16M 11/28* | (2006.01) | |
| *A47B 21/02* | (2006.01) | |
| *F16M 11/10* | (2006.01) | |
| *F16M 11/18* | (2006.01) | |
| *F16M 11/20* | (2006.01) | |
| *F16M 11/42* | (2006.01) | |
| *B62B 5/00* | (2006.01) | |
| *B62B 3/10* | (2006.01) | |
| *B62B 5/04* | (2006.01) | |

(52) U.S. Cl.
CPC ............ *B62B 3/002* (2013.01); *B62B 3/008* (2013.01); *B62B 3/02* (2013.01); *B62B 3/10* (2013.01); *B62B 5/0043* (2013.01); *B62B 5/04* (2013.01); *F16M 11/10* (2013.01); *F16M 11/18* (2013.01); *F16M 11/2021* (2013.01); *F16M 11/28* (2013.01); *F16M 11/42* (2013.01); *B62B 5/0033* (2013.01); *B62B 2202/56* (2013.01); *B62B 2206/06* (2013.01)

(58) Field of Classification Search
CPC ... B62B 5/04; B62B 2202/56; B62B 2206/06; B62B 5/0033; F16M 11/10; F16M 11/18; F16M 11/2021; F16M 11/42; F16M 11/28; A47B 21/02; A47B 21/04; A61G 12/001
USPC ......... 280/6.15; 361/679.01, 679.02, 679.05, 361/679.08, 679.2, 679.21, 679.44
See application file for complete search history.

(56) References Cited

U.S. PATENT DOCUMENTS

| | | | |
|---|---|---|---|
| 2,848,290 A | 8/1958 | Doty | |
| 2,906,575 A | 9/1959 | Schlackman et al. | |
| 3,896,744 A | 7/1975 | Goebl | |
| 4,077,535 A | 3/1978 | Oriol | |
| 4,195,578 A | 4/1980 | Benoit et al. | |
| 4,258,825 A | 3/1981 | Collins | |
| 4,474,116 A | 10/1984 | Castenada et al. | |
| 4,511,015 A | 4/1985 | Purdy | |
| D289,081 S | 3/1987 | Ludwig | |
| 4,664,584 A | 5/1987 | Braun et al. | |
| 4,694,930 A | 9/1987 | Kishi | |
| 4,697,661 A | 10/1987 | Pajerski et al. | |
| 4,715,295 A | 12/1987 | Hartman et al. | |
| 5,020,793 A | 6/1991 | Loane | |
| 5,174,223 A * | 12/1992 | Nagy | A47B 21/00 108/50.01 |
| 5,317,336 A | 5/1994 | Hall | |
| 5,335,651 A | 8/1994 | Foster et al. | |
| 5,337,845 A | 8/1994 | Foster et al. | |
| 5,394,809 A | 3/1995 | Feldpausch et al. | |
| 5,399,007 A | 3/1995 | Marconet | |
| 5,409,107 A | 4/1995 | Browne | |
| 5,450,800 A | 9/1995 | Leonard | |
| 5,457,831 A | 10/1995 | Foster et al. | |
| 5,460,392 A | 10/1995 | Hansen | |
| 5,542,637 A | 8/1996 | Schriner | |
| 5,549,264 A | 8/1996 | West | |
| 5,553,550 A | 9/1996 | Doyle | |
| 5,601,037 A | 2/1997 | Meyer et al. | |
| 5,607,091 A | 3/1997 | Musacchia | |
| 5,630,566 A * | 5/1997 | Case | A47B 23/046 248/122.1 |
| 5,673,983 A | 10/1997 | Carlson et al. | |
| 5,704,299 A | 1/1998 | Corpuz, Jr. et al. | |
| D393,382 S | 4/1998 | Rutter et al. | |
| 5,740,887 A | 4/1998 | Unger et al. | |
| 5,765,842 A | 6/1998 | Phaneuf et al. | |
| 5,775,234 A | 7/1998 | Solomon et al. | |
| 5,779,211 A | 7/1998 | Bird | |
| 5,806,943 A | 9/1998 | Dell et al. | |
| 5,826,842 A | 10/1998 | Paulse et al. | |
| 5,839,713 A | 11/1998 | Wright | |
| 5,842,672 A | 12/1998 | Sweere et al. | |
| 5,868,079 A | 2/1999 | Charny | |
| 5,886,685 A | 3/1999 | Best | |
| 5,894,805 A | 4/1999 | Raasch et al. | |
| 5,918,841 A | 7/1999 | Sweere et al. | |
| 5,941,182 A | 8/1999 | Greene | |
| 5,992,817 A | 11/1999 | Klitsner et al. | |
| 6,021,722 A | 2/2000 | Raycraft | |
| 6,024,427 A | 2/2000 | Underwood et al. | |
| 6,029,587 A | 2/2000 | Rozier, Jr. et al. | |
| 6,059,454 A | 5/2000 | Masson | |
| 6,098,935 A | 8/2000 | Kaplan et al. | |
| 6,098,936 A * | 8/2000 | Birrell | F16M 11/08 248/122.1 |
| 6,101,956 A | 8/2000 | Keil | |
| 6,110,999 A | 8/2000 | Ourth et al. | |
| 6,241,047 B1 | 6/2001 | Gilliland et al. | |
| 6,269,753 B1 | 8/2001 | Roddan | |
| 6,286,794 B1 | 9/2001 | Harbin | |
| 6,298,794 B1 * | 10/2001 | Brown | A47B 21/00 108/50.01 |
| 6,339,732 B1 | 1/2002 | Phoon et al. | |
| 6,360,675 B1 | 3/2002 | Jones | |
| 6,394,402 B2 | 5/2002 | Coonan et al. | |
| 6,397,761 B1 | 6/2002 | Moore | |
| 6,435,109 B1 | 8/2002 | Dell et al. | |
| 6,443,543 B1 | 9/2002 | Chiang | |
| 6,481,808 B2 | 11/2002 | Cinese | |
| 6,493,217 B1 | 12/2002 | Jenkins, Jr. | |
| 6,493,220 B1 | 12/2002 | Clark et al. | |
| 6,546,880 B2 | 4/2003 | Agee | |
| 6,595,144 B1 | 7/2003 | Doyle | |
| 6,663,072 B1 | 12/2003 | Ritchey et al. | |
| 6,682,030 B2 | 1/2004 | Santoro et al. | |
| 6,683,784 B1 | 1/2004 | Bidwell et al. | |
| 6,698,770 B2 | 3/2004 | Eriksson et al. | |
| 6,721,178 B1 | 4/2004 | Clark et al. | |
| 6,915,155 B2 * | 7/2005 | Surwillo | A61B 5/0402 600/450 |
| 7,009,840 B2 | 3/2006 | Clark et al. | |
| 7,066,433 B2 | 6/2006 | Oddsen, Jr. | |
| 7,123,285 B2 | 10/2006 | Smith et al. | |
| 7,154,397 B2 * | 12/2006 | Zerhusen | A47B 23/046 340/573.1 |
| 7,324,334 B2 | 1/2008 | Sween et al. | |
| 7,375,492 B2 | 5/2008 | Calhoon et al. | |
| 7,506,592 B2 | 3/2009 | Rossini | |
| 7,534,211 B2 | 5/2009 | Hwang et al. | |
| 7,591,786 B2 | 9/2009 | Holmberg et al. | |
| 7,594,668 B2 | 9/2009 | Arceta et al. | |
| 7,611,119 B2 | 11/2009 | Rossini | |
| 7,612,999 B2 | 11/2009 | Clark et al. | |
| 7,791,866 B2 | 9/2010 | Clark et al. | |
| 7,861,991 B1 | 1/2011 | Sylvertooth-Jackson | |
| 8,020,821 B1 | 9/2011 | Tamayori | |
| 8,215,650 B2 | 7/2012 | Arceta et al. | |
| 8,286,977 B2 * | 10/2012 | Butler | A61G 12/001 280/47.34 |
| 8,812,153 B2 * | 8/2014 | Reckelhoff | A61G 12/001 700/243 |
| 2002/0125664 A1 | 9/2002 | Eriksson et al. | |
| 2002/0165641 A1 | 11/2002 | Manalang et al. | |
| 2003/0042373 A1 | 3/2003 | MacLeod | |
| 2003/0142468 A1 | 7/2003 | Chin et al. | |
| 2004/0010328 A1 | 1/2004 | Carson et al. | |

(56) References Cited

U.S. PATENT DOCUMENTS

| | | | |
|---|---|---|---|
| 2004/0054436 A1 | 3/2004 | Haitin et al. | |
| 2004/0186357 A1 | 9/2004 | Soderberg et al. | |
| 2004/0200870 A1 | 10/2004 | Haber | |
| 2004/0256432 A1 | 12/2004 | Orenstein | |
| 2004/0262867 A1 | 12/2004 | Arceta et al. | |
| 2005/0062238 A1 | 3/2005 | Broadfield et al. | |
| 2005/0176508 A1 | 8/2005 | Chastain | |
| 2005/0206107 A1 | 9/2005 | Schubert et al. | |
| 2005/0264649 A1 | 12/2005 | Chang et al. | |
| 2005/0284991 A1 | 12/2005 | Saez | |
| 2006/0125356 A1* | 6/2006 | Meek, Jr. | A61G 12/001 312/215 |
| 2006/0186622 A1 | 8/2006 | Darling, III | |
| 2007/0001413 A1 | 1/2007 | Rossini | |
| 2007/0125931 A1 | 6/2007 | Slappay | |
| 2007/0185390 A1* | 8/2007 | Perkins | A61B 5/0002 600/300 |
| 2007/0227409 A1 | 10/2007 | Chu | |
| 2007/0228680 A1 | 10/2007 | Reppert et al. | |
| 2008/0043386 A1 | 2/2008 | Atlas et al. | |
| 2008/0265107 A1 | 10/2008 | Saez | |
| 2010/0213679 A1 | 8/2010 | Smith et al. | |
| 2011/0042911 A1 | 2/2011 | Kozlowski, Jr. et al. | |
| 2011/0140381 A1 | 6/2011 | Rossini | |
| 2011/0233350 A1 | 9/2011 | Burgess et al. | |
| 2012/0248719 A1 | 10/2012 | Rossini et al. | |

FOREIGN PATENT DOCUMENTS

| | | |
|---|---|---|
| DE | 19540057 C1 | 8/1996 |
| DE | 19836603 C2 | 8/1998 |
| DE | 19822121 A1 | 11/1999 |
| DE | 20011786 U1 | 12/2000 |
| DE | 20018317 U1 | 2/2001 |
| DE | 10019617 C2 | 6/2002 |
| DE | 19822121 C2 | 10/2002 |
| EP | 0321137 A2 | 6/1989 |
| EP | 0253333 B1 | 3/1993 |
| EP | 1574196 B1 | 6/2006 |
| FR | 2625718 A1 | 7/1989 |
| FR | 2746273 B1 | 5/1998 |
| FR | 2813510 B1 | 1/2003 |
| GB | 2106377 B | 10/1985 |
| GB | 2171597 A | 9/1986 |
| JP | 1192357 A | 8/1989 |
| JP | H09140461 A | 6/1997 |
| JP | H11342027 A | 12/1999 |
| JP | 2001353028 A | 12/2001 |
| JP | 2002177347 A | 6/2002 |
| JP | 2002248019 A | 9/2002 |
| JP | 2002272539 A | 9/2002 |
| JP | 2003220032 A | 8/2003 |
| WO | 99/62375 A | 12/1999 |
| WO | 2005107525 A2 | 11/2005 |
| WO | 2007035185 A2 | 3/2007 |
| WO | 2007120519 A2 | 10/2007 |
| WO | 2010098752 A1 | 9/2010 |

OTHER PUBLICATIONS

Chronological screenshots of the video appearing at http://www.youtube.com/watch?v=Q0hTjlBgei0. The screenshots are taken approximately once every second, from the beginning of the video to the end. The screenshots were retrieved on Nov. 5, 2014. SPEEDKAR99. "Ergotables Automatic Height Adjustment System." The publication date of the video is unknown, but is possibly as early as Apr. 16, 2010 based on the fact that the youtube webpage says "Uploaded on Apr 16, 2010."

Transcript of the spoken audio portions of the video appearing at http://www.youtube.com/watch?v=Q0hTjlBgei0. The transcript covers the spoken audio portions of the video from the beginning of the video to the end. The audio transcription was prepared on Nov. 4, 2014. SPEEDKAR99. "Ergotables Automatic Height Adjustment System." The publication date of the video is unknown, but is possibly as early as Apr. 16, 2010 based on the fact that the youtube webpage says "Uploaded on Apr 16, 2010."

International Search Report and Written Opinion by the International Searching Authority for PCT Application PCT/US2009/035180 dated Apr. 14, 2009.

T5 Brochure, Point-of-Care Technology Carts for PC's, Laptops and Tablet PC's by Humanscale Corporation issued on Feb. 1, 2006.

Point-of-Care Hospital Carts & Wall Mounts Feature Unotron Washable Computer Keyboards and Mice to Mitigate Spread of Hospital Infection literature published on Apr. 3, 2007.

SmartTouch Medical, Inc. and S&S Med Cart, Inc. to Debut the smartCART (TM) Partner Plus II (TM) Finger Activated Rolling Medicine Cart at the 41st ASHP Clinical Meeting and Tradeshow; Global leader in hospital medicine carts to unveil innovative rolling medical dispensing cart that provides secure access to medication, syringes and other controlled or regulated medical items, With the Touch of a Finger literature published on Nov. 28, 2006.

BioMETRX, Inc. and S&S MedCart, Inc. Sign Deal to Jointly Develop Finger Activated Medicine Carts to Help Hospitals Control Access to Controlled Substances; Global Leader in Rolling Medicine Carts to Integrate SmartTOUCH (TM) Technology to Provide Secure Access to Medication, Syringes and Other Controlled or Regulated Medical Items, With the Touch of a Finger literature published on May 15, 2006.

Artromick Aligns with McKesson to Enhance Medication Safety at the Patients' Bedside; Strategic Relationship Combines Leading Mobile Computing Workstations with Unique Integration Software to Give Nurses More Time with Patients, literature published on Feb. 26, 2008.

Valence Battery Solutions Increasingly of Interest in Health Care Industry; Numerous Industry Leaders Demonstrating Use of Valence Power Technology at HIMSS 2005 literature published on Feb. 15, 2005.

International Search Report and Written Opinion by the International Searching Authority for PCT Application PCT/US2009/35185 dated Apr. 29, 2009.

International Search Report and Written Opinion by the International Searching Authority for PCT Application PCT/US2009/35183 dated Apr. 30, 2009.

International Preliminary Report on Patentability by the International Searching Authority for PCT Application PCT/US2009/35183 dated Oct. 21, 2011.

Enovate Medical Computer Carts brochure, At least as early as 2011.

Enovate Lite Medical Carts brochure, At least as early as 2011.

"Overbed Tables." The Overbed Table L2 (Saudi (Overseas) Marketing and Trading Co., retrieved from https://web.archive.org/web/20030107120733/https://www.somatco.com/overbedtables.htm; Jan. 7, 2003 (WayBack Machine).

EP Application No. 13154733.3, Search Report of the EPO Searching Authority for Applicant Humanscale Corporation dated Jan. 29, 2016.

EP Application No. 13154733.3, Extended Search Report of the EPO Searching Authority for Applicant Humanscale Corporation dated Apr. 7, 2016.

EP Application No. 13154733.3—Examiner's Action dated Mar. 16, 2018.

* cited by examiner

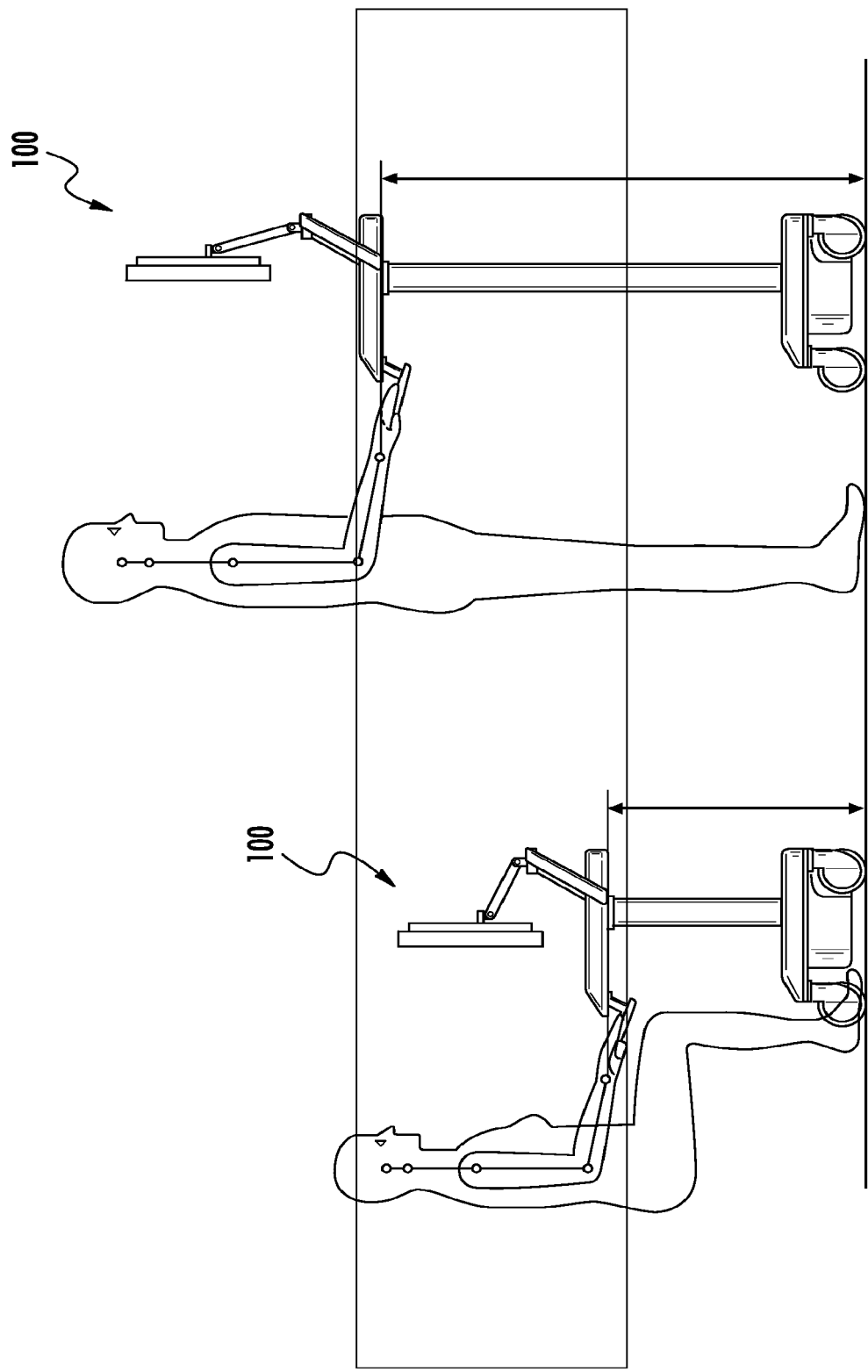

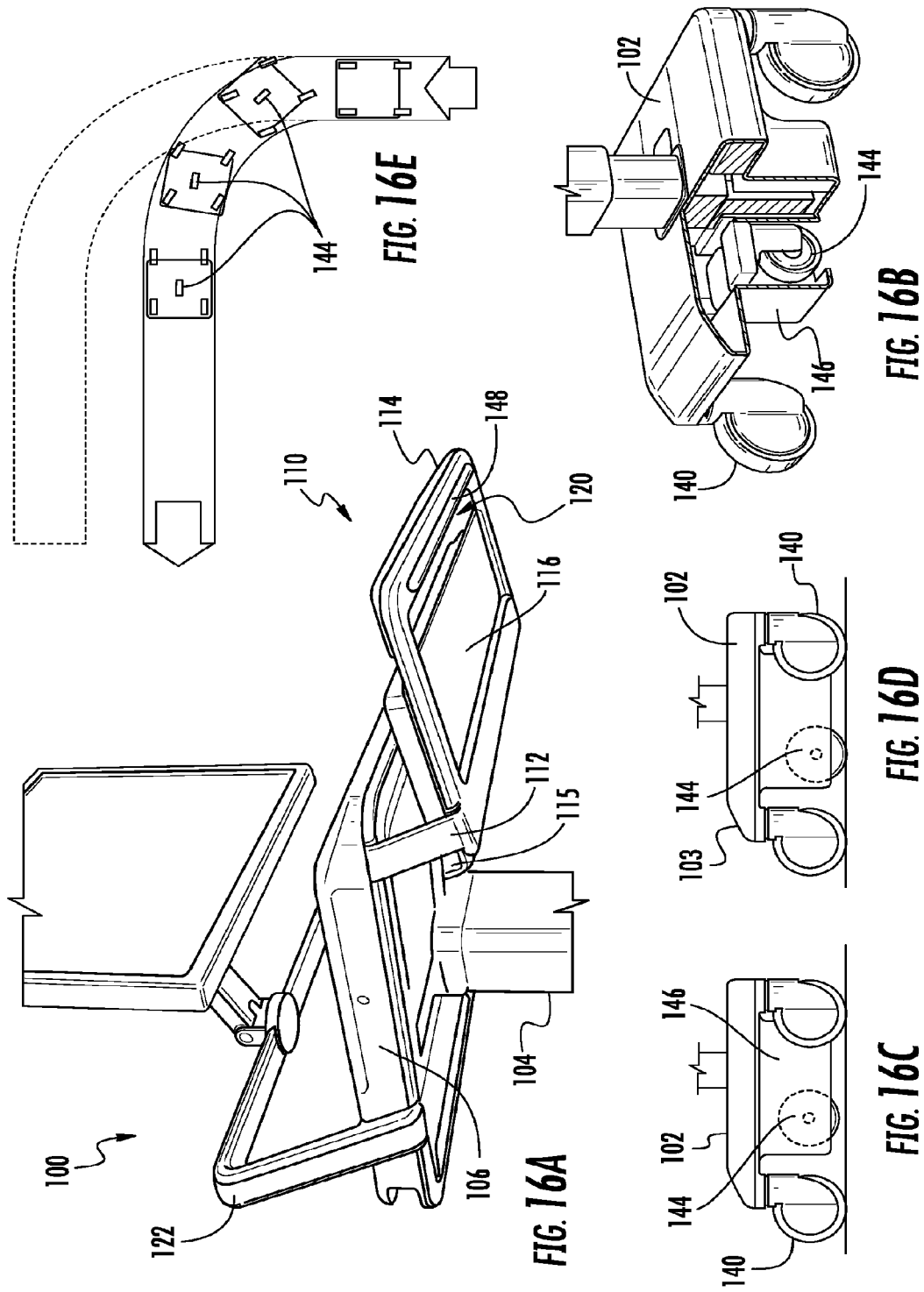

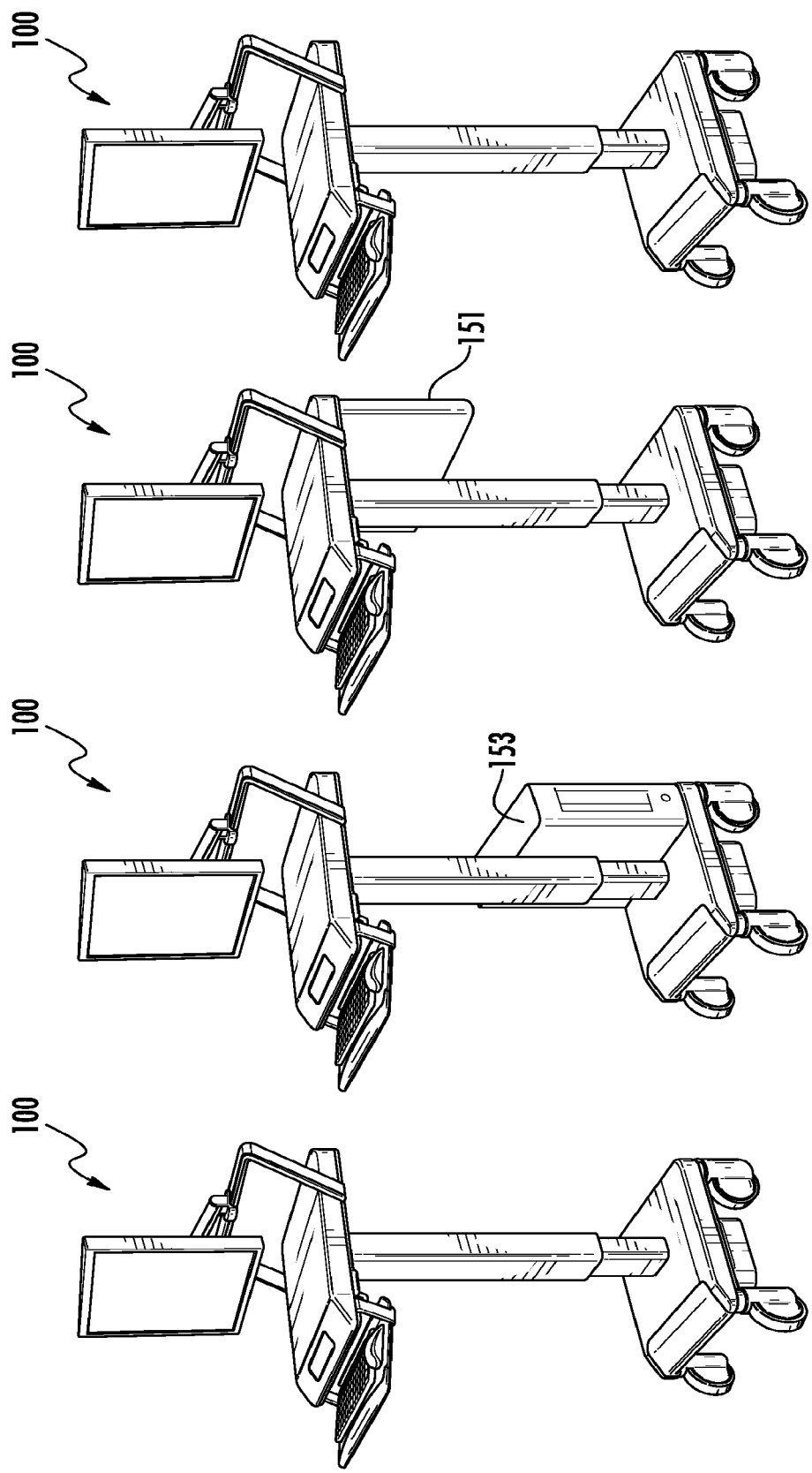

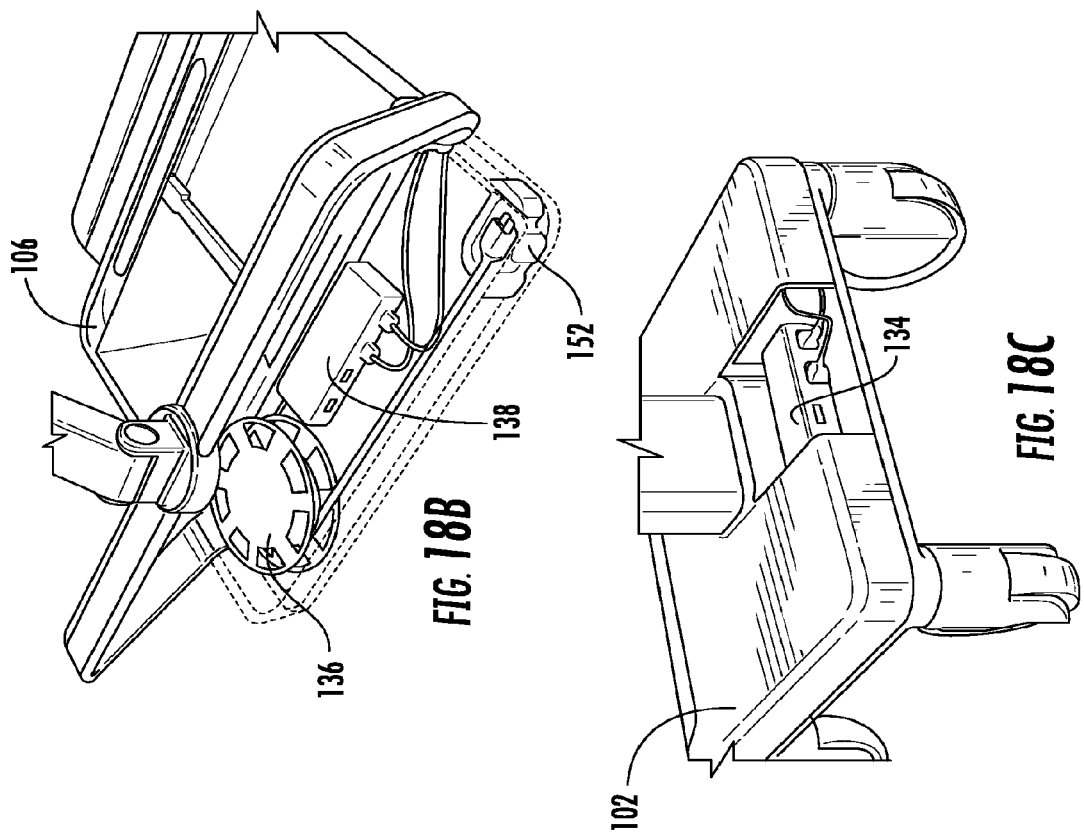
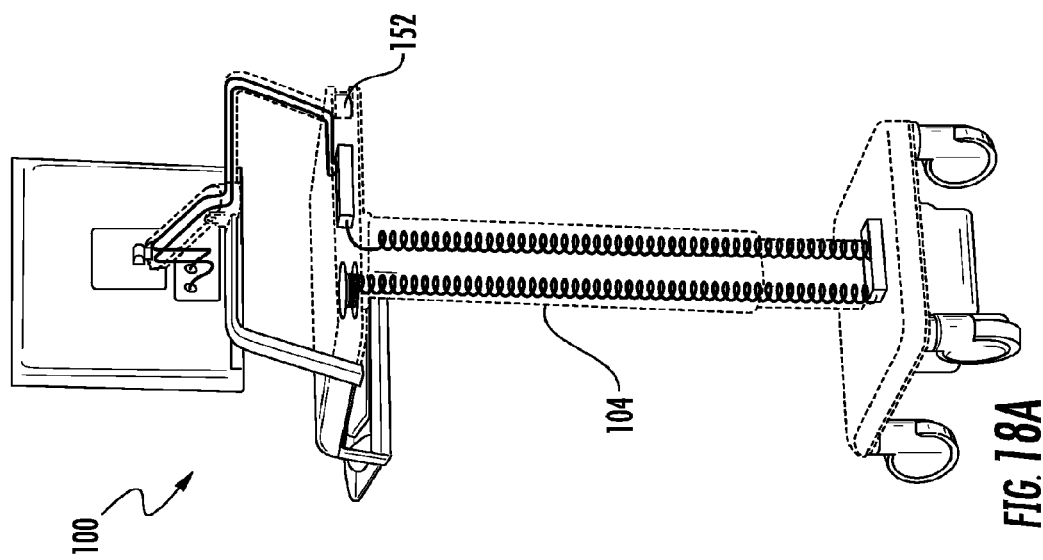

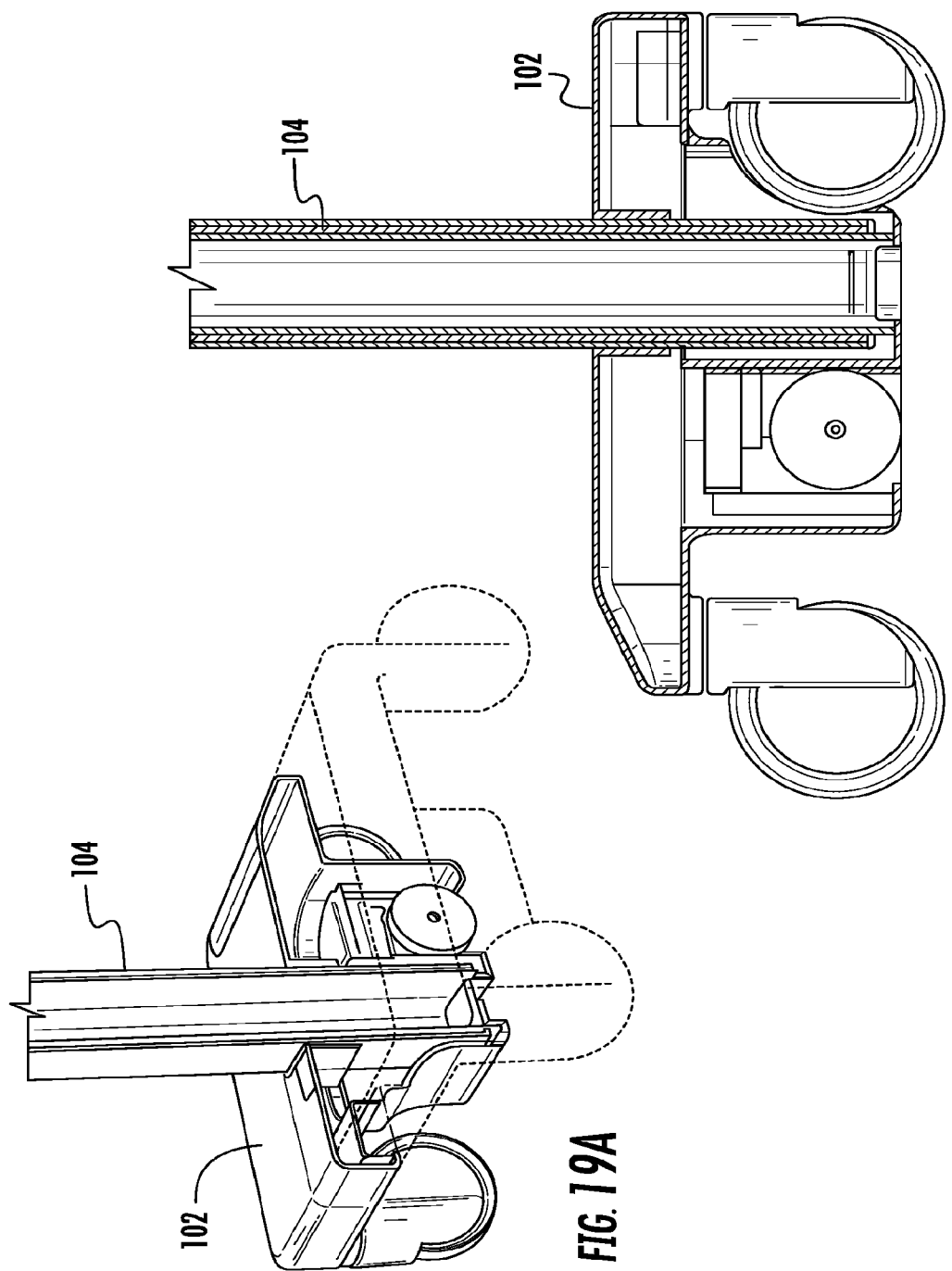

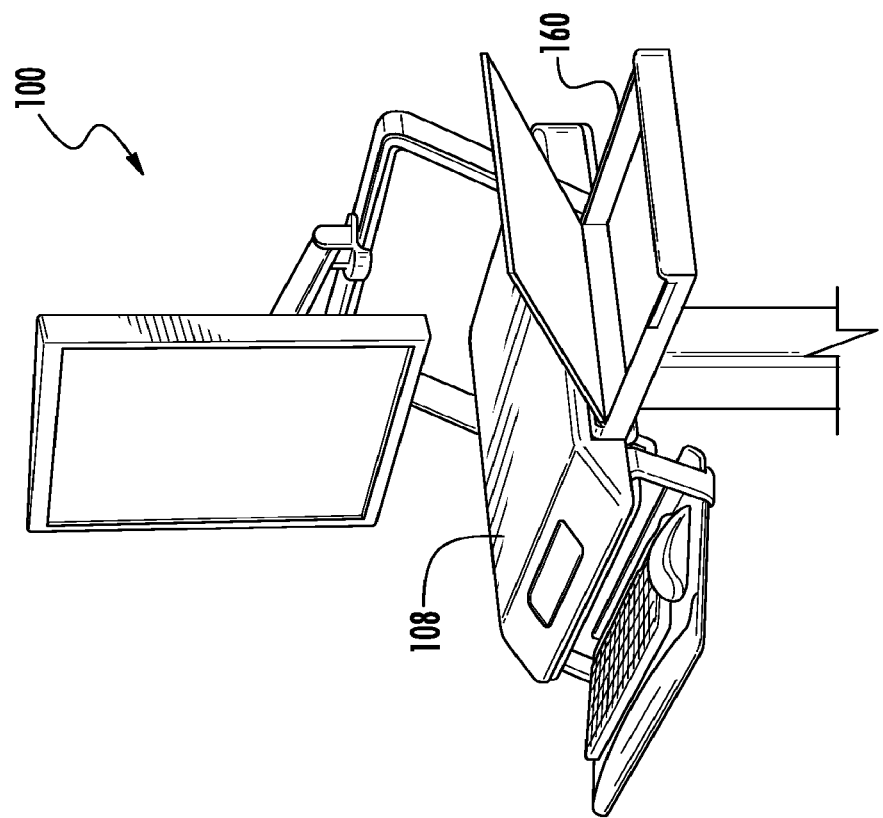
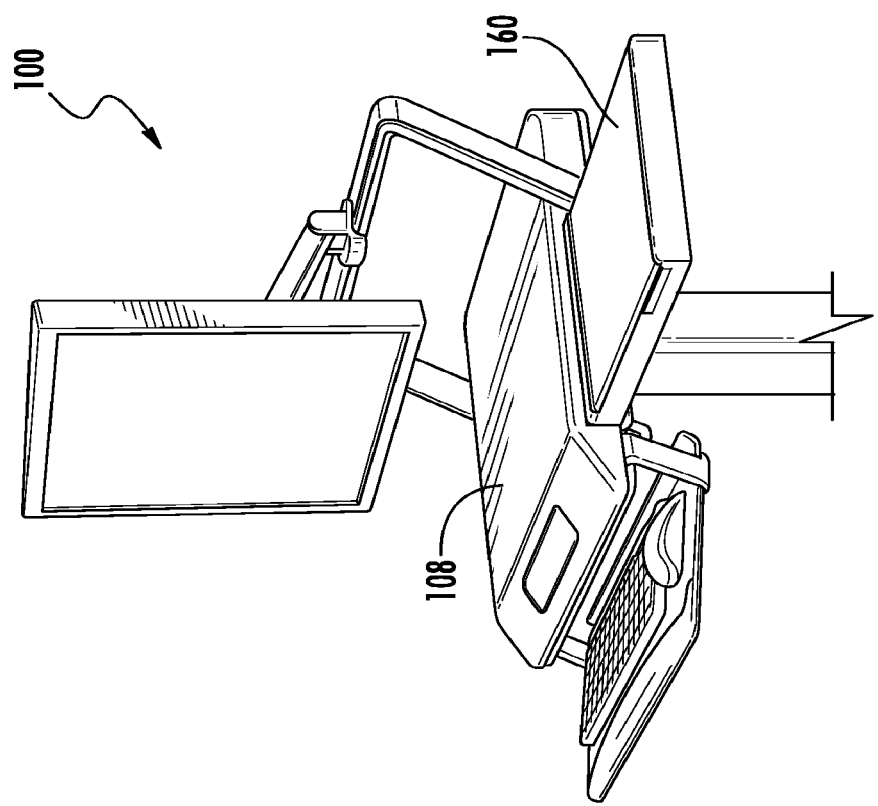

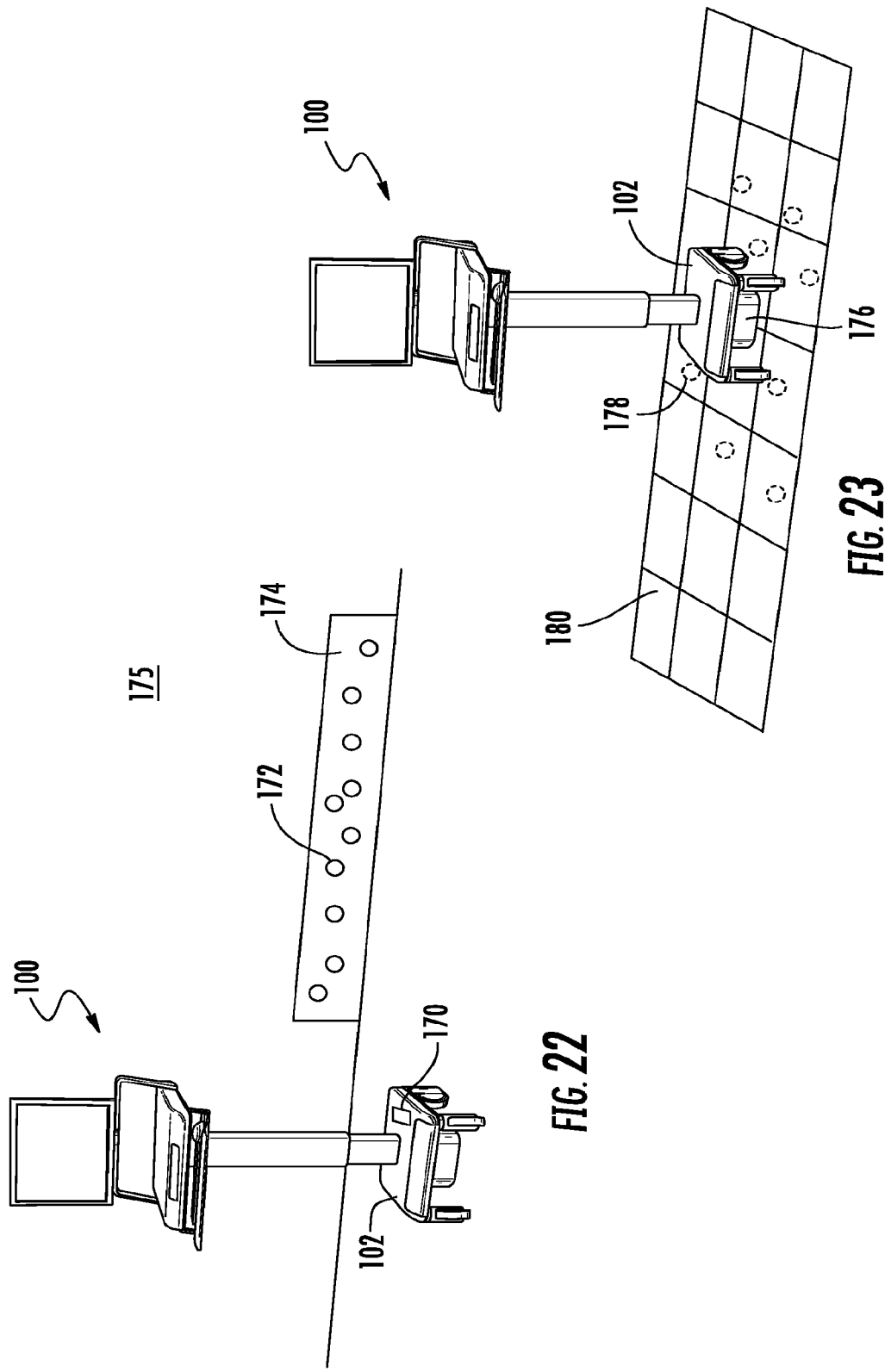

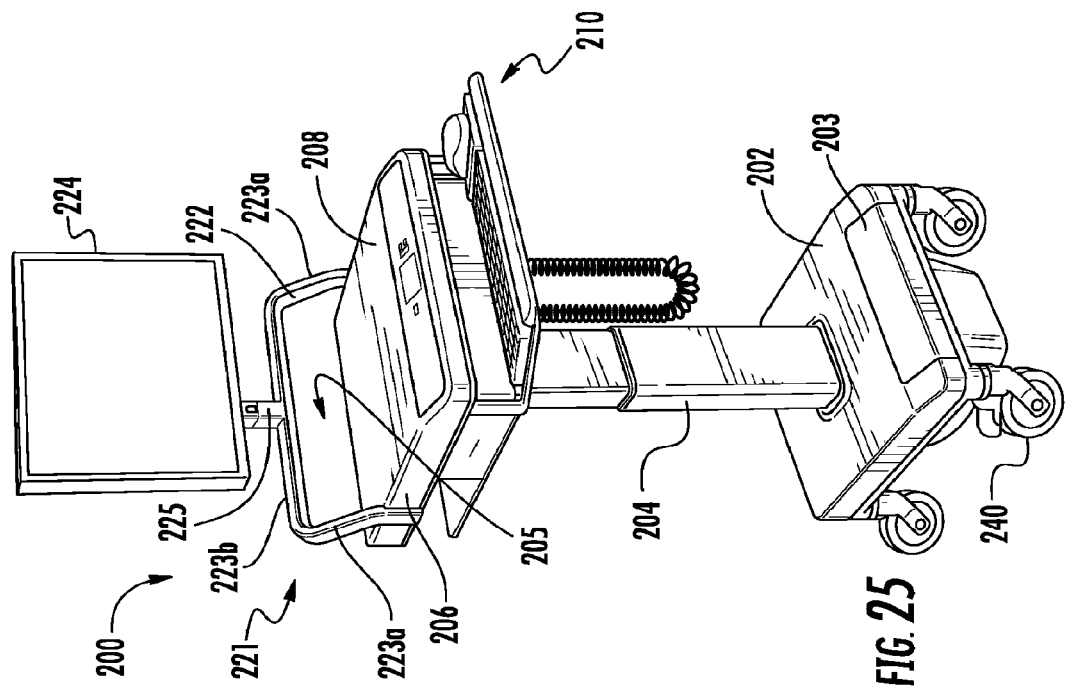
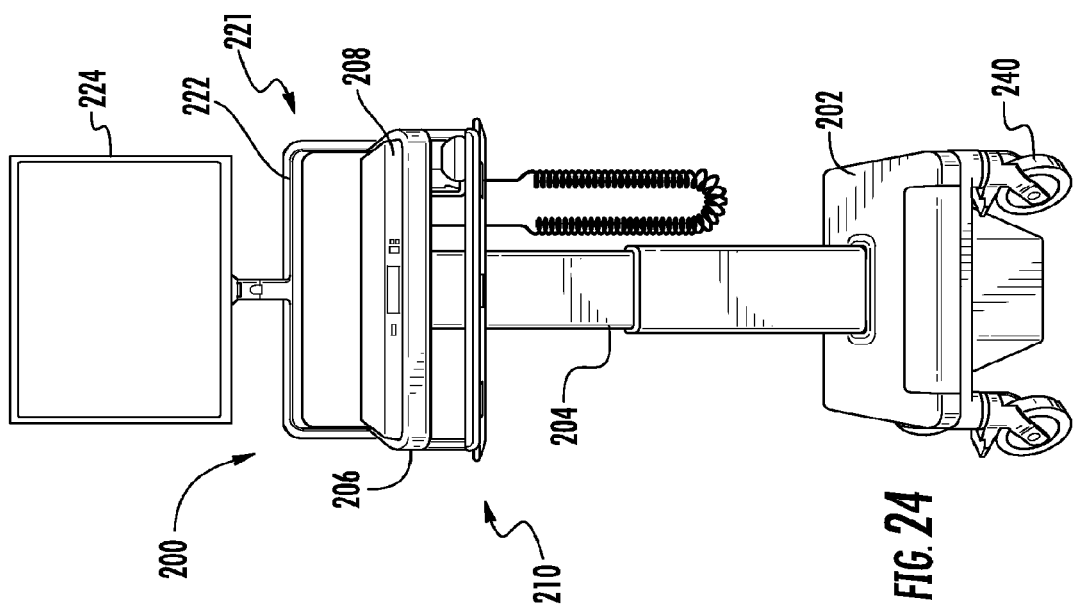

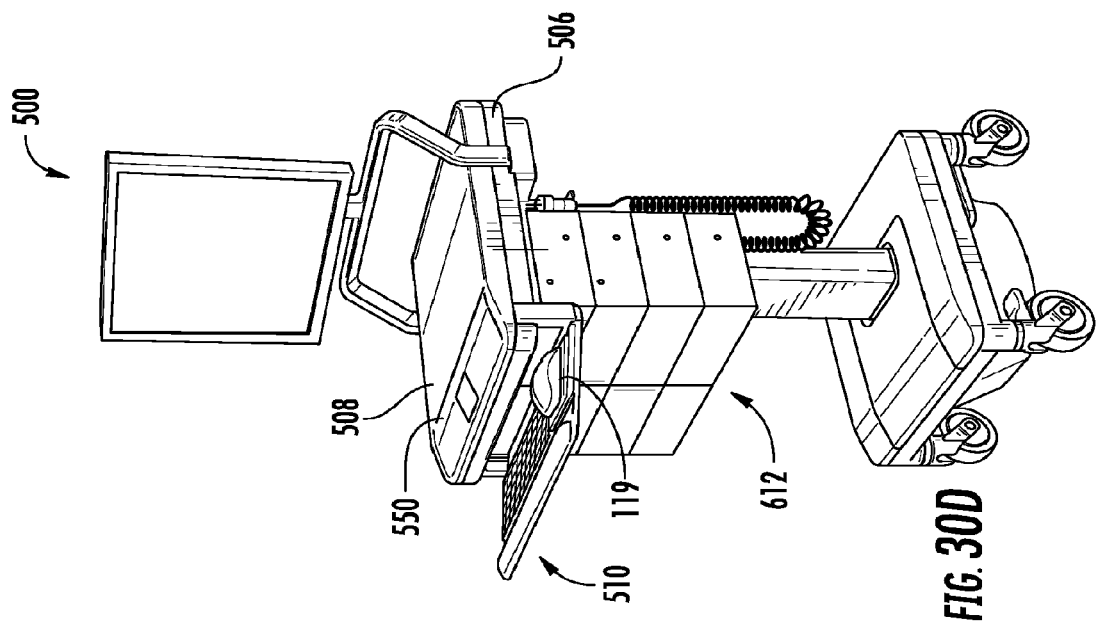
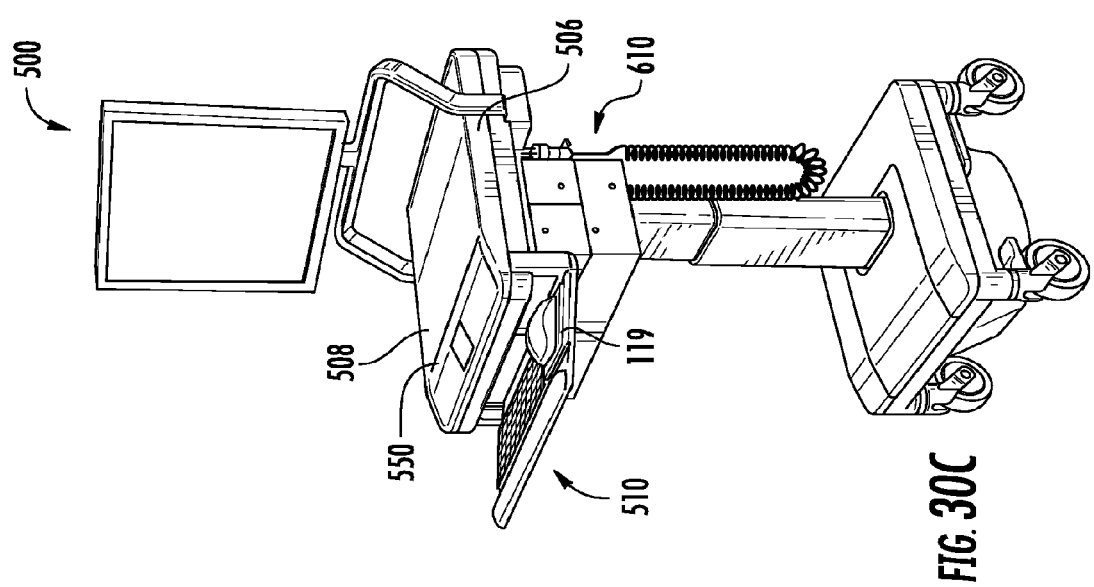

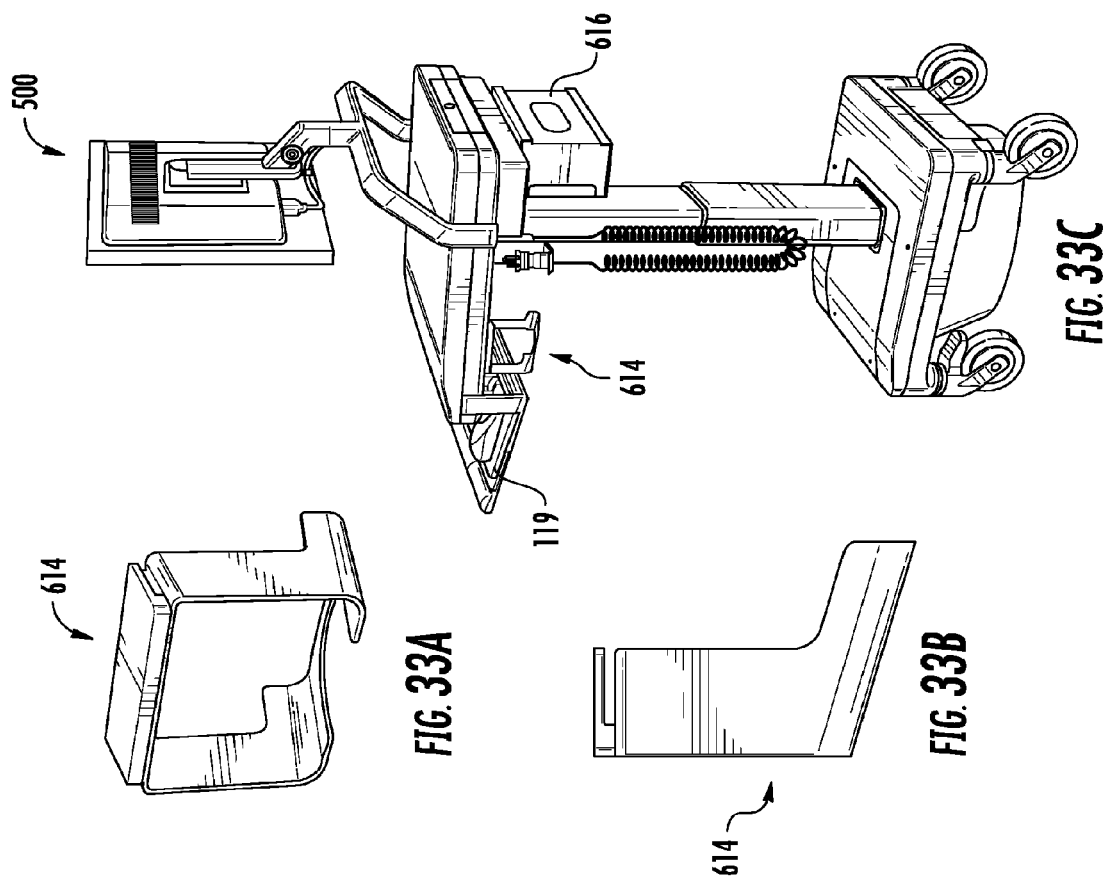

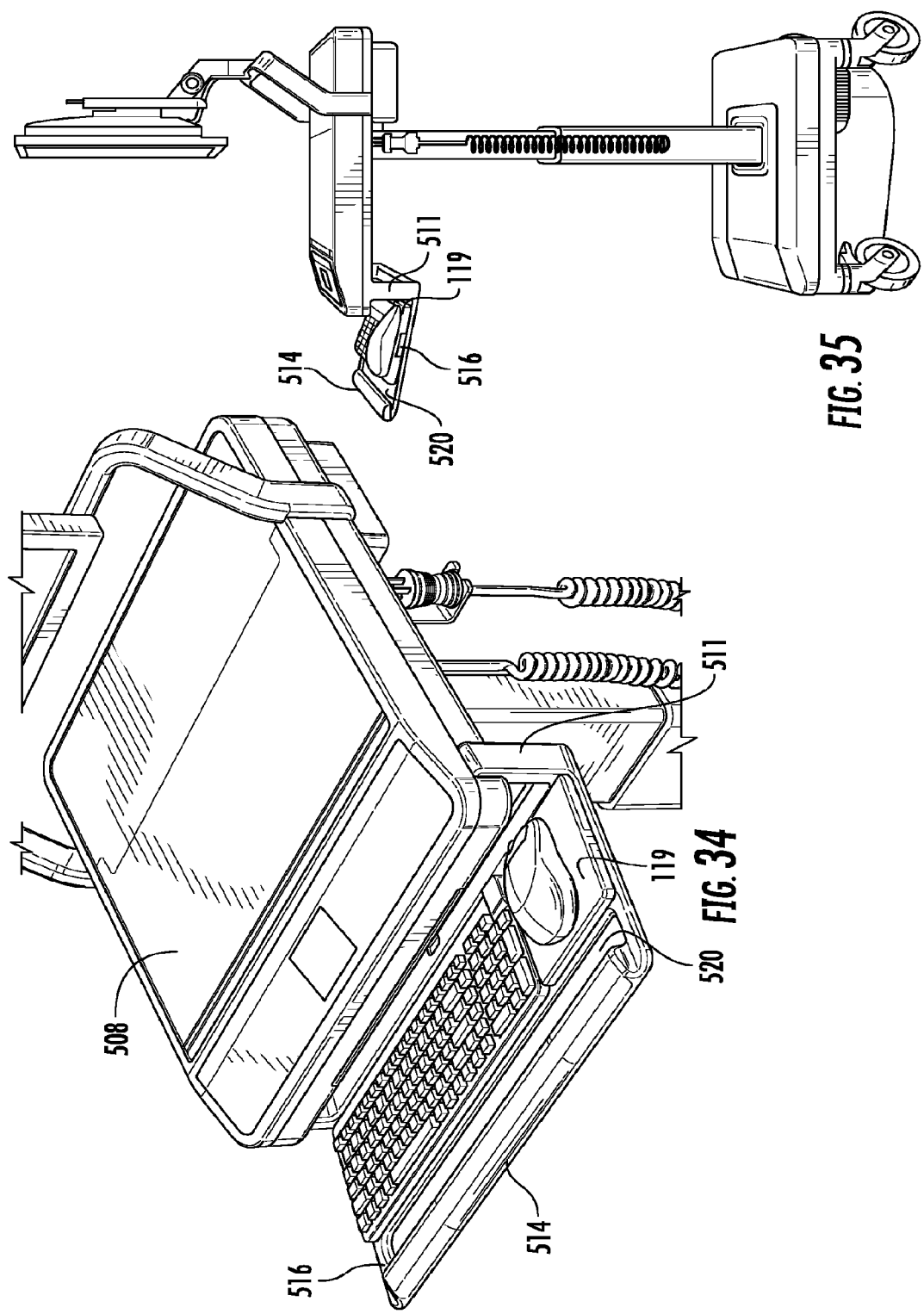

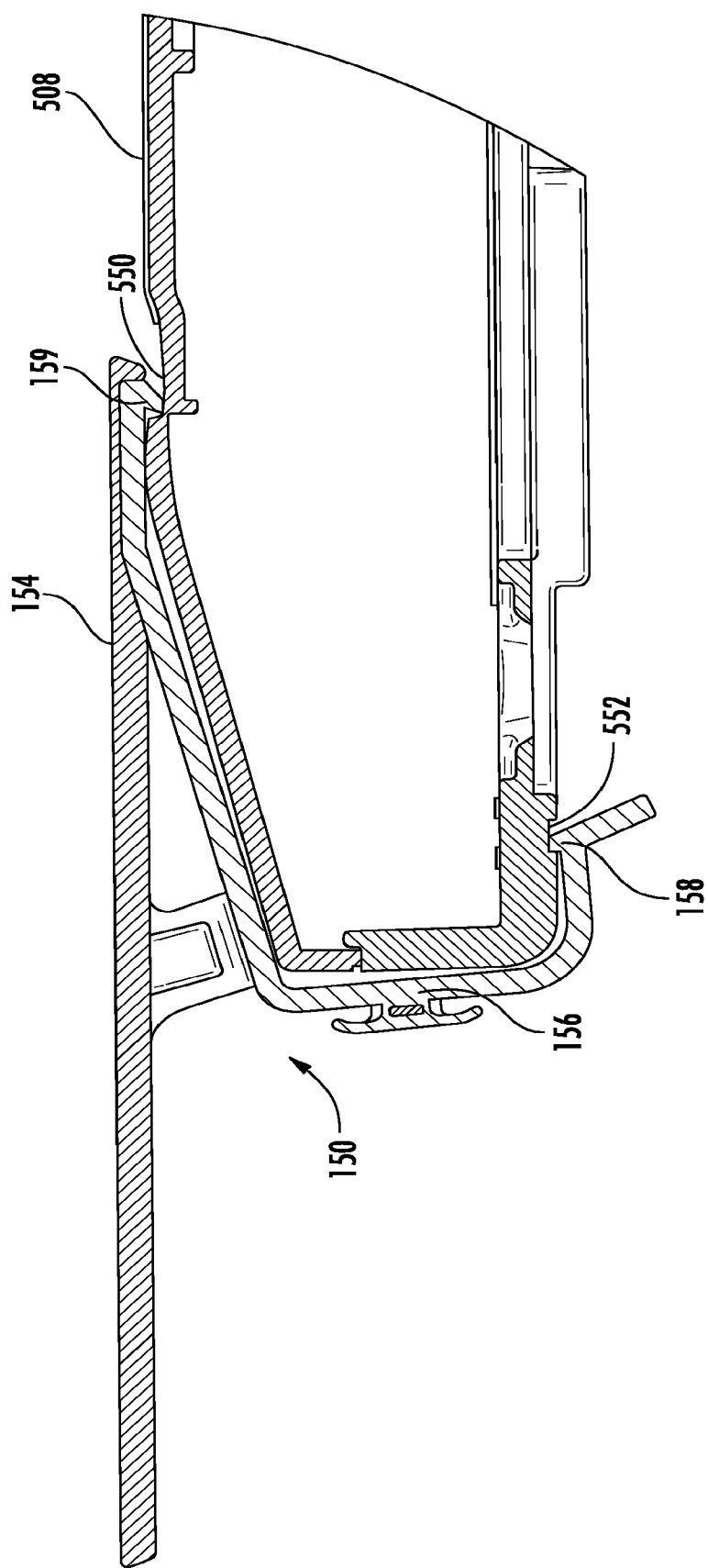

ACCESSORY CART

CROSS-REFERENCE TO RELATED APPLICATIONS

This application is a continuation of U.S. application Ser. No. 14/714,994, filed on May 18, 2015, which application was a continuation of U.S. application Ser. No. 13/763,395, filed on Feb. 8, 2013, which claims the benefit of U.S. Provisional Application No. 61/596,635, filed Feb. 8, 2012, all of which are hereby incorporated by reference.

BACKGROUND OF THE INVENTION

Mobile accessory carts that carry computers are commonly used in healthcare and other industries to provide portable workstations. Similar to a computer workstation in an ordinary office setting, ergonomic features are important for mobile accessory carts as well. For example, the height of the work surface, keyboard, and monitor all play a major role in ergonomics because posture is determined by sight and reach. Adjustability of the height of the work surface, keyboard, and/or monitor is very important as users come in all shapes and sizes. While current mobile accessory carts allow users to adjust the height of the work surface, keyboard, and/or monitor, the adjustability mechanisms are often cumbersome and complicated and require many steps. As a result, users are not making the necessary adjustments to mobile accessory carts. This is especially true in the healthcare industry, where healthcare professionals typically use multiple mobile accessory carts throughout the day, for an average of only approximately three to four minutes at a time.

Further, many healthcare professionals do not receive the proper training regarding optimal ergonomic positioning of the work surface, keyboard, and monitor of a mobile accessory cart. Therefore, in rare situations in which users do make adjustments to a mobile accessory cart, they are often not ergonomically correct for the particular user. By not making the proper ergonomic adjustments, continuous work in a poor ergonomic position leads to repetitive strain injuries, which are increasingly being reported by healthcare professionals.

SUMMARY OF THE INVENTION

An embodiment of the present invention is directed to an accessory cart that comprises a base, a housing element, which is connected to the base, extending upward from the base and a work platform that is connected to the housing element with the height of the work platform being automatically adjustable.

An embodiment of an accessory cart where the work platform is automatically adjustable to a plurality of predetermined heights and each of the plurality of predetermined heights corresponds to a measurable aspect of a potential user.

An embodiment of an accessory cart where the measurable aspect of the potential user is a height of the potential user.

An embodiment of an accessory cart where the height of the work platform is automatically adjustable without a need for a user to manually make a selection on the accessory cart.

An embodiment of an accessory cart, which comprises a sensor, and the height of the work platform is automatically adjustable based on information obtained by the sensor about the user.

An embodiment of an accessory cart, which comprises a deployable tracking wheel, which is located at about a center of gravity of the accessory cart, connected to the base.

An embodiment of an accessory cart, which comprises a release switch with the tracking wheel being deployable in a first state by continuous engagement of the release switch by a potential user and the tracking wheel being retractable in a second state by disengagement of the release switch by the potential user.

An embodiment of an accessory cart where the work platform has a first groove formed in a first surface of the work platform and a second groove formed in a second surface of the work platform, which opposes the first surface and the computer input device platform is slideable along the first groove and the second groove at most to a first lateral edge or a second lateral edge of the work platform.

An embodiment of an accessory cart where the accessory cart comprises a computer input device platform that is removably connected to the work platform.

An embodiment of an accessory cart, which comprises a power supply located on the accessory cart with the power supply capable of being wirelessly charged.

An embodiment of an accessory cart, which comprises a keyboard platform that is fixed at an ergonomically negative angle.

An embodiment of an accessory cart, which comprises a keyboard support surface and the keyboard support surface is fixed at an ergonomically negative angle.

An embodiment of an accessory cart, which comprises a computer input device platform that is magnetically connectable to the keyboard support surface.

An embodiment of a method of adjusting a height of a platform of an accessory cart, that comprises the steps of equipping the accessory cart with a plurality of predetermined platform heights, and automatically adjusting the platform to at least one of the plurality of predetermined platform heights.

An embodiment of a method of adjusting a height of a platform of an accessory cart where the method comprises the step of corresponding a measurable aspect of a potential user to at least one of the plurality of predetermined platform heights.

An embodiment of a method of adjusting a height of a platform of an accessory cart where the method comprises the step of corresponding a height of a potential user to at least one of the plurality of predetermined platform heights.

An embodiment of a method of adjusting a height of a platform of an accessory cart where the method comprises the step of wirelessly charging a power supply located on the accessory cart.

An embodiment of a method of adjusting a height of a platform of an accessory cart where the method comprises the step of deploying a tracking wheel from a base of the accessory cart.

An embodiment of an accessory cart that comprises a base, a housing element, which is connected to the base, extending upward from the base, a platform, which is connected to the housing element and a means for automatically adjusting a height of the platform.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which should be considered in conjunction with the accompanying drawings in which:

FIG. 12 is a diagram depicting the accessory cart of FIG. 1 in both a sit configuration and a stand configuration;

FIG. 16A is a partial, bottom side perspective view of the accessory cart of FIG. 1;

FIG. 16B is a partial, cross-sectional, side perspective view of a lower portion of the accessory cart of FIG. 1;

FIGS. 16C and 16D are partial, transparent views of the accessory cart of FIG. 1;

FIG. 16E is a diagram illustrating a path of motion for the accessory cart of FIG. 1;

FIGS. 17A to 17D illustrate perspective views of the accessory cart of FIG. 1, shown with various computer solutions;

FIG. 18A is a rear perspective, partially transparent, view of the accessory cart of FIG. 1;

FIG. 18B is a partial, rear perspective view of a top portion of the accessory cart of FIG. 1;

FIG. 18C is a partial, rear perspective view of a lower portion of the accessory cart of FIG. 1;

FIG. 19A is a partial, cross-sectional, rear side perspective view of the accessory cart of FIG. 1;

FIG. 19B is a partial, cross-sectional side view of the accessory cart of FIG. 1;

FIGS. 20A and 20B are partial, side perspective views of the accessory cart of FIG. 1, shown with an extended work surface;

FIGS. 22 and 23 are perspective views of the accessory cart of FIG. 1, shown with wireless battery recharging solutions;

FIG. 24 is a front view of another exemplary accessory cart;

FIG. 25 is front side perspective view of the accessory cart of FIG. 24;

FIGS. 30A to 30D are side perspective views of embodiments of an yet a further exemplary accessory cart shown with various additional storage configurations;

FIGS. 33A to 33E are perspective views of storage options and components thereof for use with an accessory cart;

FIG. 34 is a partial, perspective view of an upper portion of the accessory cart of FIGS. 30A to 30D;

FIG. 35 is a side perspective view of the accessory cart of FIGS. 30A to 30D;

FIG. 36 is a cross-sectional view of a computer input device platform assembled with an accessory cart;

DETAILED DESCRIPTION OF THE INVENTION

Figure 1:
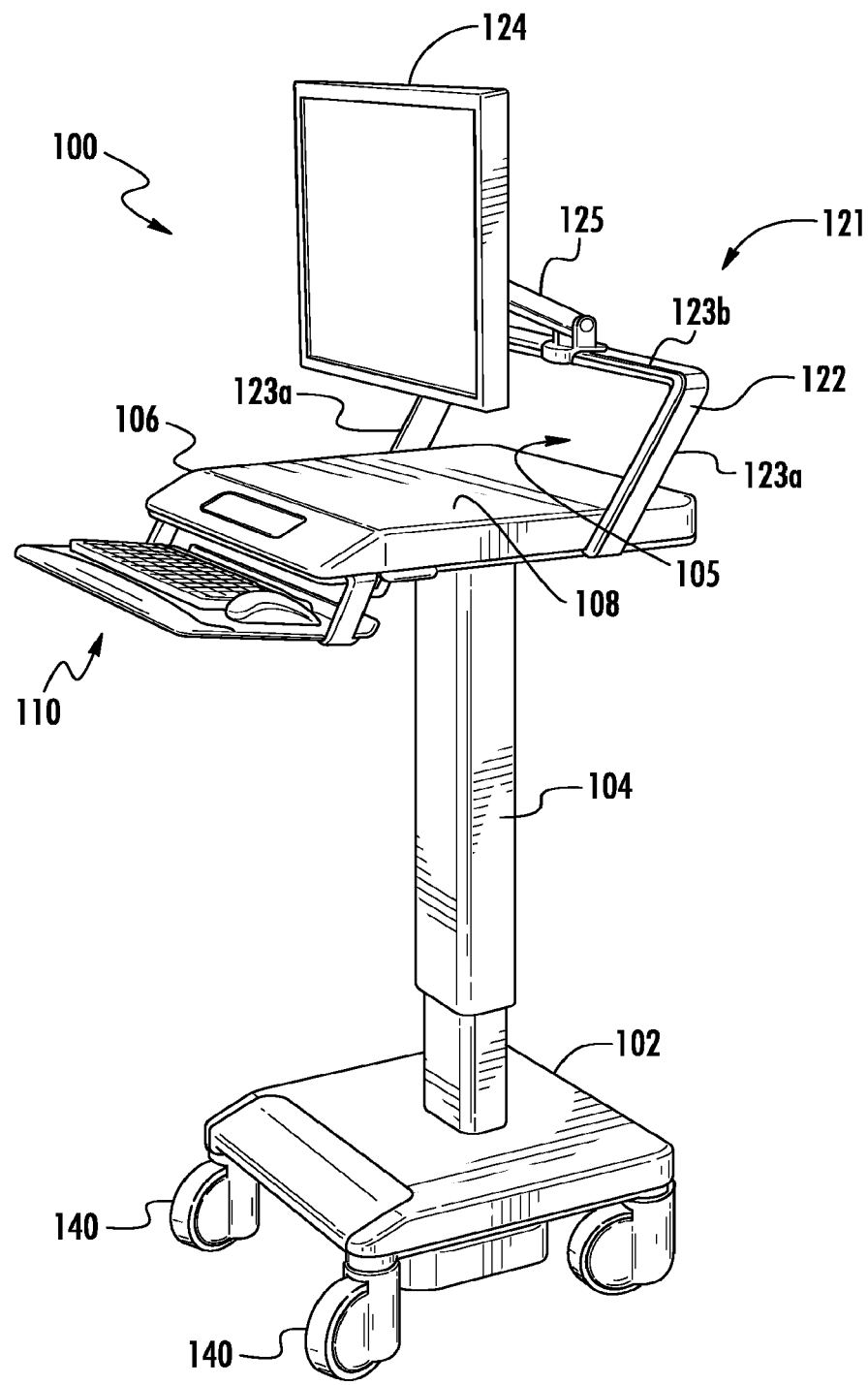
FIG. 1 is a side perspective view of an exemplary mobile accessory cart.
Figure 3:
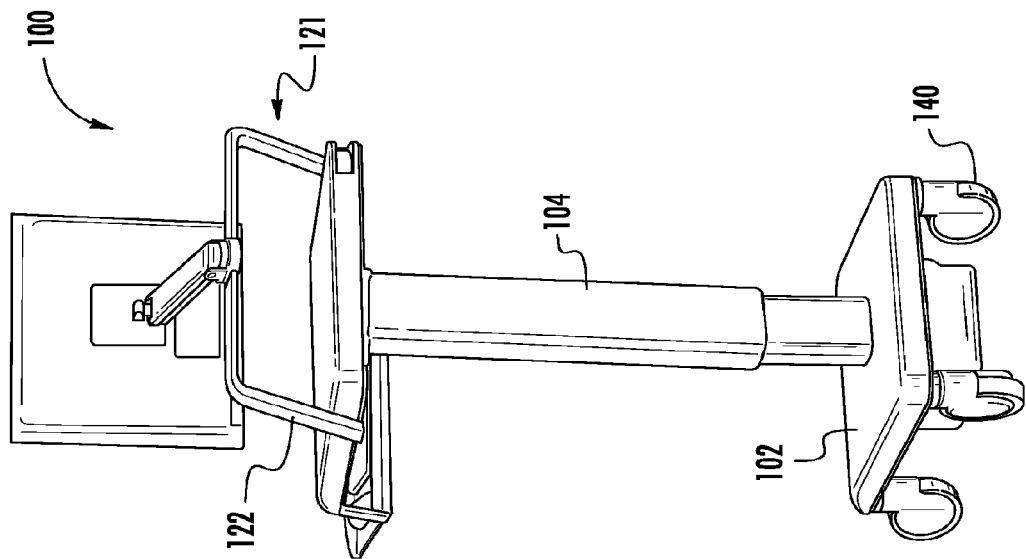
FIG. 3 is a rear perspective view of the accessory cart of FIG. 1.
Figure 2:
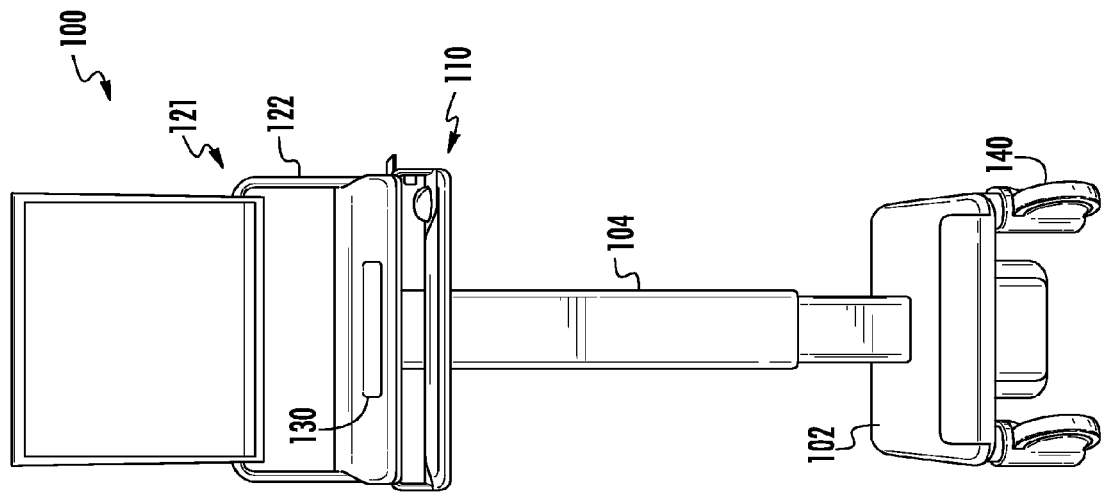
FIG. 2 is a front view of the accessory cart of FIG. 1.

As required, detailed embodiments of the present invention are disclosed herein. However, it is to be understood that the disclosed embodiments are merely exemplary of the invention, which can be embodied in various forms. As such, any feature(s) used in one embodiment can be used in another embodiment. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The terms "connected" and/or "coupled," as used herein, are defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the drawings, beginning with FIGS. 1 to 4, an exemplary embodiment of a mobile accessory cart 100 is shown that can include features such as ergonomic positioning of a keyboard and a mouse, automatic height adjustment of a work surface to an ergonomically correct position, and advanced control and mobility. The accessory cart 100 includes a work platform 106 supported by a height-adjustable housing element 104 extending upward from a base 102. A monitor mount 121 extends upward from the work platform 106 to support a monitor 124 above the work platform 106 such that the monitor 124 can be both rotatable and height-adjustable. A keyboard platform 110 is fitted to extend from the underside of the work platform 106 to support a keyboard 117 thereon at an ergonomic fixed angle relative to the work platform 106.

Figure 4:
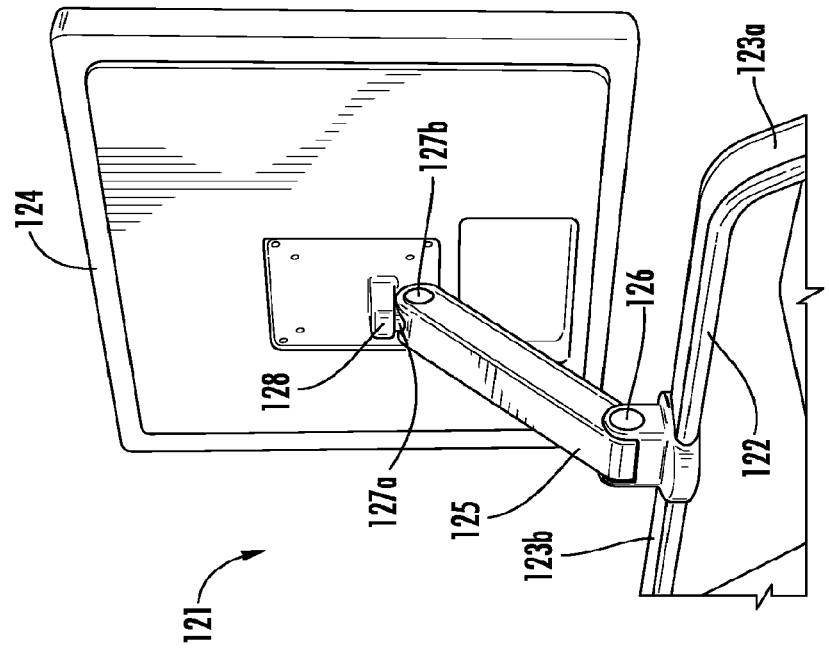
FIG. 4 is a partial rear perspective view of the accessory cart of FIG. 1.

As shown in FIGS. 1 and 4, the monitor mount 121 includes a gantry or monitor support frame 122, which has two side portions 123a and a middle portion 123b extending therebetween. Each side portion 123a is attached to an opposing side of the work platform 106 and extends upward from the work platform 106 to the middle portion 123b, thereby providing an increased work surface 108 and better viewing access through a viewing window 105 created between the work surface 108 and the raised middle portion 123b of the monitor support frame 122 while guiding the cart 100. Moreover, the monitor mount 121 can further function as a handle for pulling the accessory cart 100 from behind, can be used as an attachment point for accessories, and allows for integrated cable management of cables that extend from within the work platform 106 through an opening 152 at the back side of the accessory cart 100 (see FIGS. 18A, 18B, and 21C).

Figure 5:
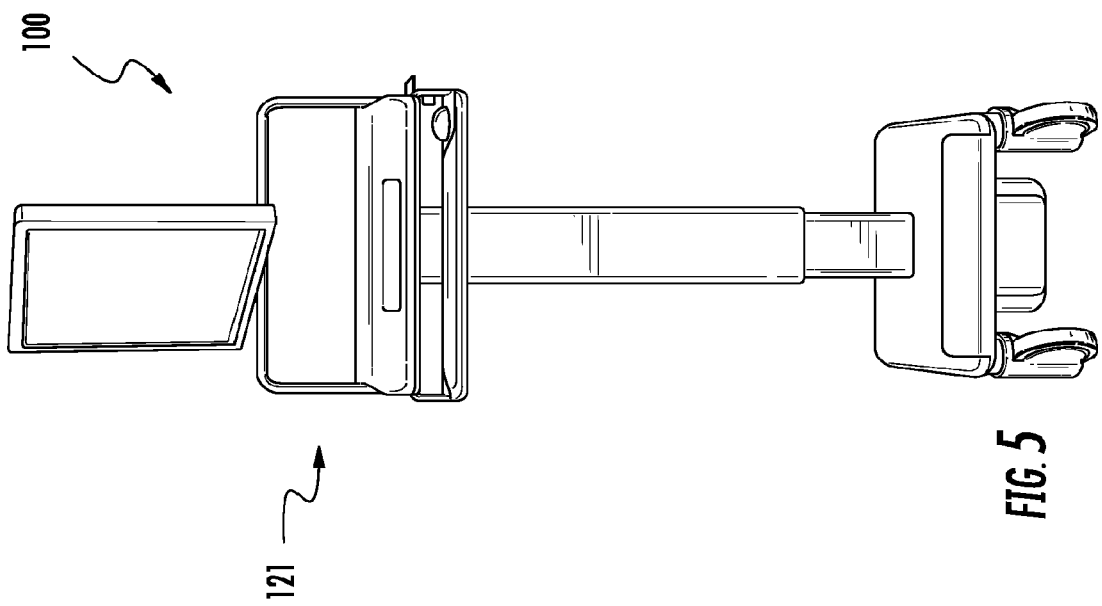
FIG. 5 is another front view of the accessory cart of FIG. 1, shown with a monitor rotated to the side.

The monitor mount 121 further includes an exemplary monitor arm 125 that attaches at a first end to and extends upward from the middle portion 123b of the monitor support frame 122 with the monitor 124 attached at a second end of the monitor arm 125. The monitor arm 125 can be pivotally mounted to the monitor support frame 122 at a pivot point 126. The pivot point 126 defines an axis substantially parallel to the middle portion 123b of the monitor support frame 122 and about which the monitor arm 125 is operable to pivot to adjust the vertical position of the monitor 124 relative to the work platform 106. In a further exemplary embodiment, a mounting bracket 128, which is affixable to the back of the monitor 124, can be pivotally mounted to the monitor arm 125 at pivot points 127a and 127b. The pivot point 127a defines an axis that is substantially perpendicular to the middle portion 123b of the monitor support frame 122 and about which the monitor 124 is operable to pivot to allow rotation of the monitor 124, for example, to share information with a patient (see FIG. 5). The pivot point 127b defines an axis that is substantially parallel to the middle portion 123b of the monitor support frame 122 and about which the monitor 124 is operable to pivot such that the monitor 124 is rotatable at an angle relative to the work platform 106, for bi-focal use, transporting the accessory cart 100, or touch screen use (if using a touch-screen monitor), for example (see FIG. 6). Additionally, the monitor mount 121, in combination with the monitor arm 125 and the pivot points 126, 127a, and 127b aid to ensure that the height of a monitor is adjustable within a proper ergonomic range (e.g., 19 inches-23 inches for 5% females to 95% males). It should be noted that the pivot points 126, 127a, and 127b can include any suitable connection mechanism for pivotally connecting monitors to monitor arms. Moreover, the exemplary monitor mount 121 can be configured to hold different sized monitors using industry-standard VESA mounts and brackets. Accordingly, the exemplary monitor mount 121 addresses the challenges faced by users of mobile accessory carts that comprise a computer monitor, including those depicted in FIGS. 7A to 7C, (the adjustment of a monitor to ensure that it is positioned within a proper ergonomic range for a user, allowing the monitor to be rotatable, and having the ability to move a monitor out of view when a user is moving the accessory cart) among others.

Figure 8:
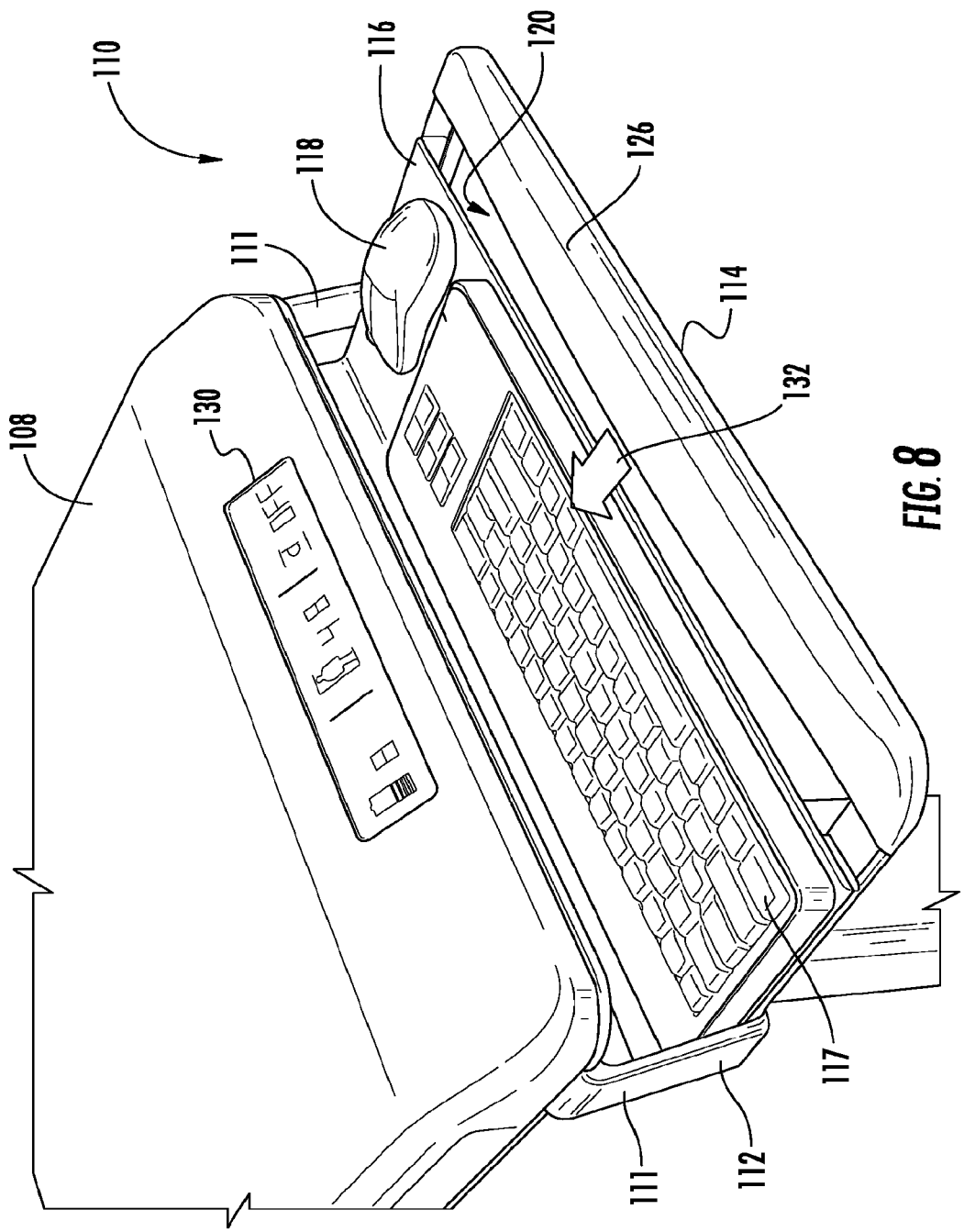
FIG. 8 is a partial perspective view of the accessory cart of FIG. 1.

FIG. 8 depicts an embodiment of the keyboard platform 110, which includes a keyboard support frame 112 and a keyboard support surface 116, mounted on the keyboard support frame 112. The keyboard support frame 112 includes a substantially U-shaped support bar 114 and a pair of arms 111 with each arm 111 extending at a fixed angle from an end of the U-shaped support bar 114. The arms 111 attach the keyboard support frame 112 to the underside or the sides of the work platform 106 so that the U-shaped support bar 114 (and the keyboard support surface 116 and keyboard 117 mounted thereon) is fixed at an ergonomic negative angle, which will be described in further detail below with respect to FIGS. 9B, 10B, and 11A.

Figure 9B:
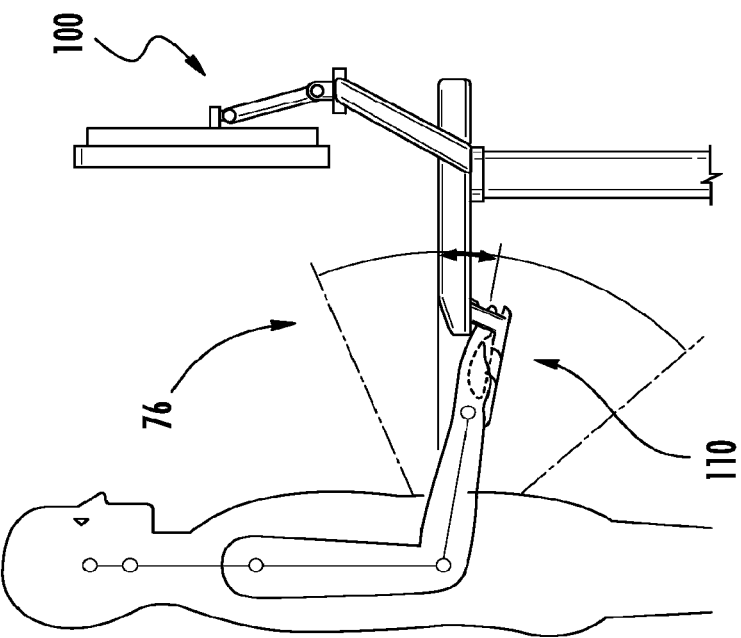
FIG. 9B is a partial side view of the accessory cart of FIG. 1, illustrating the ergonomic range for positioning of a user's forearm relative to the accessory cart.
Figure 9A:
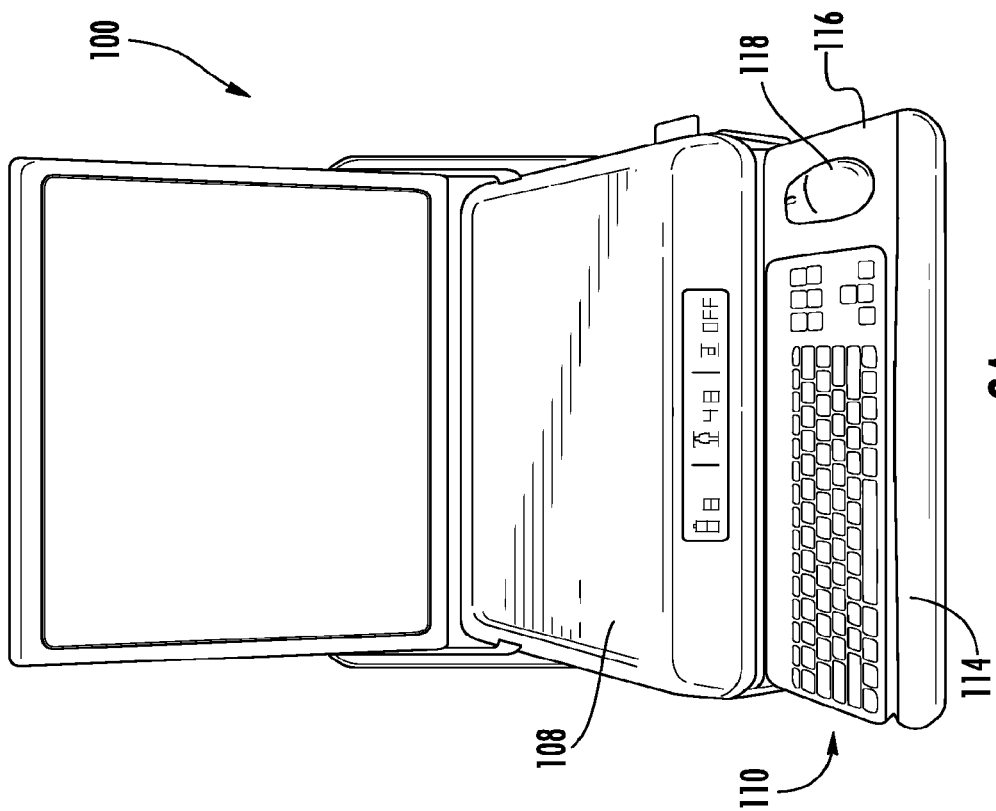
FIG. 9A is a perspective view of an upper portion of the accessory cart of FIG. 1.
Figure 10B:
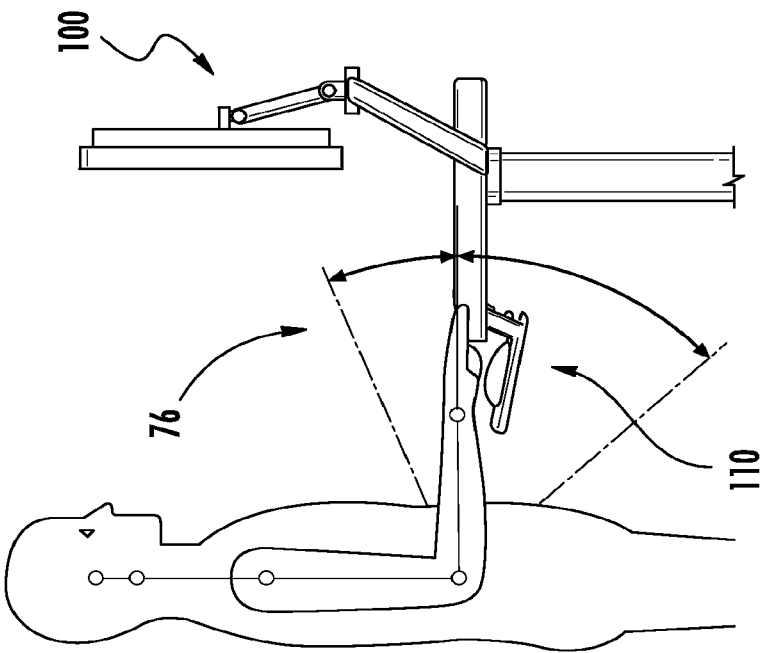
FIG. 10B is a partial side view of the accessory cart of FIG. 1, illustrating the ergonomic range for positioning of a user's forearm relative to the accessory cart.
Figure 10A:
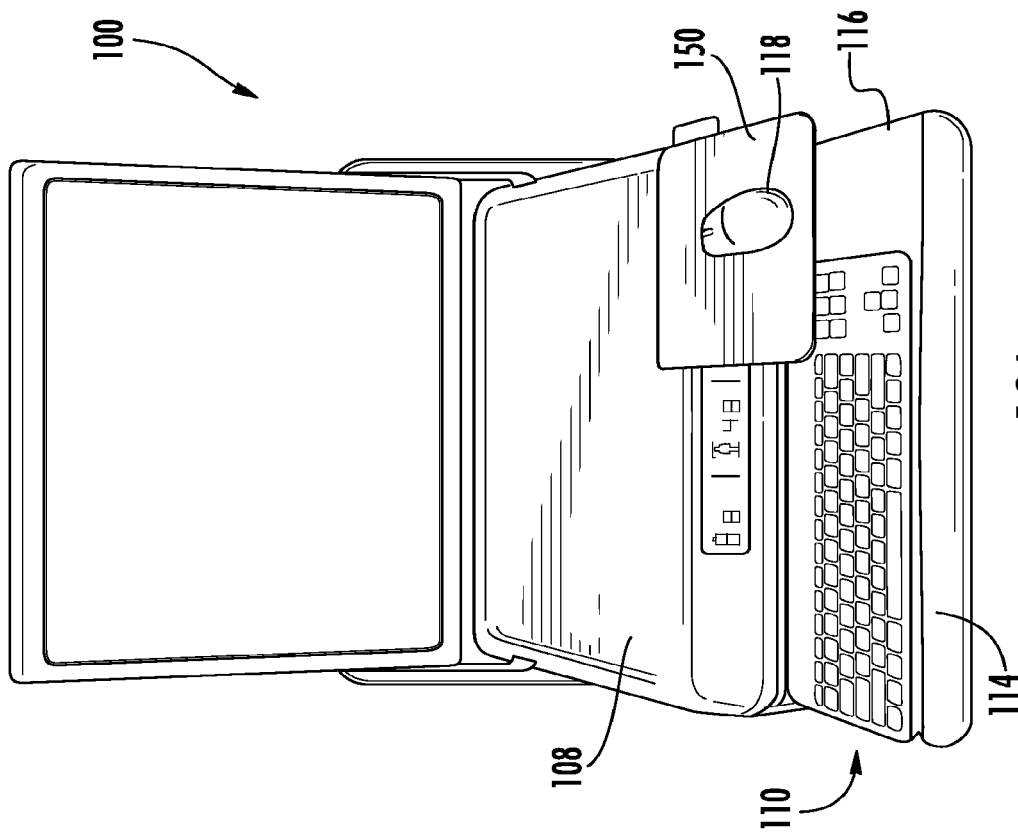
FIG. 10A is a perspective view of the upper portion of the accessory cart of FIG. 1, shown with an exemplary computer input device platform attached thereto.

In the embodiment depicted in FIG. 8, the keyboard support surface 116 is slidably mounted on the fixed keyboard support frame 112 and is movable between a first position and a second position. FIGS. 9A and 10A illustrate the keyboard support surface 116 in the first or front-most position, in which the keyboard support surface 116 abuts the U-shaped support bar 114 so that the user has full access to type on a keyboard 117 supported on the keyboard support surface 116. FIGS. 8 and 16A illustrate the keyboard support surface 116 in the second position or rear-most position, in which the keyboard support surface 116 is moved in a direction toward the work platform 106 (as indicated by the arrow 132 in FIG. 8) to create a gap 120 between the keyboard support surface 116 and the support bar 114. In this position, the support bar 114 can serve as a handle that can be grasped by a user who inserts his/her fingers within the gap 120 to maneuver the mobile accessory cart 100. Thus, the only working position in which the keyboard 117 can be placed to provide access to the keys is limited to ergonomically safe positions. In other words, the keyboard platform 110 locks out non-ergonomic work positions.

As shown in FIG. 8, an exemplary palm support 126 is provided across the front end of the U-shaped support bar 114 for added comfort during typing and transporting the accessory cart 100. The palm support 126 can be comprised of a deformable material, such as Technogel® or any other suitable material and can be attached to the U-shaped support bar 114 by any suitable attachment means, including but not limited to an overmolding, adhesives or any suitable mechanical mechanism.

In an embodiment depicted in FIG. 16A, the keyboard support surface 116 includes an upwardly curved lip 115 and/or alternative stop mechanisms (e.g., notches or posts) at its rear end to prevent the keyboard 117 from sliding out the back of the keyboard platform 110, due to the ergonomic negative tilt of the keyboard support surface 116.

In the embodiment where the keyboard support surface 116 is slidably mounted, the contact between the keyboard support surface 116 and the U-shaped support bar 114 is frictionally enhanced such that the keyboard support surface 116 does not readily slide with respect to the U-shaped support bar 114. Rather, force (i.e., either pushing or pulling on the keyboard support surface 116) is required to overcome the frictional engagement between the keyboard support surface 116 and the U-shaped support bar 114. As a result, the keyboard support surface 116 can be relatively fixed with respect to the work platform 106 at any location between the front-most and the rear-most positions. The keyboard support surface 116 may slide relative to the U-shaped support bar 114 by any suitable means, including but not limited to, channels formed in either the U-shaped support bar 114 or the underside of the keyboard support surface 116 that engage ribs on the other one of the U-shaped support bar 114 and the underside of the keyboard support surface 116.

Figure 13:
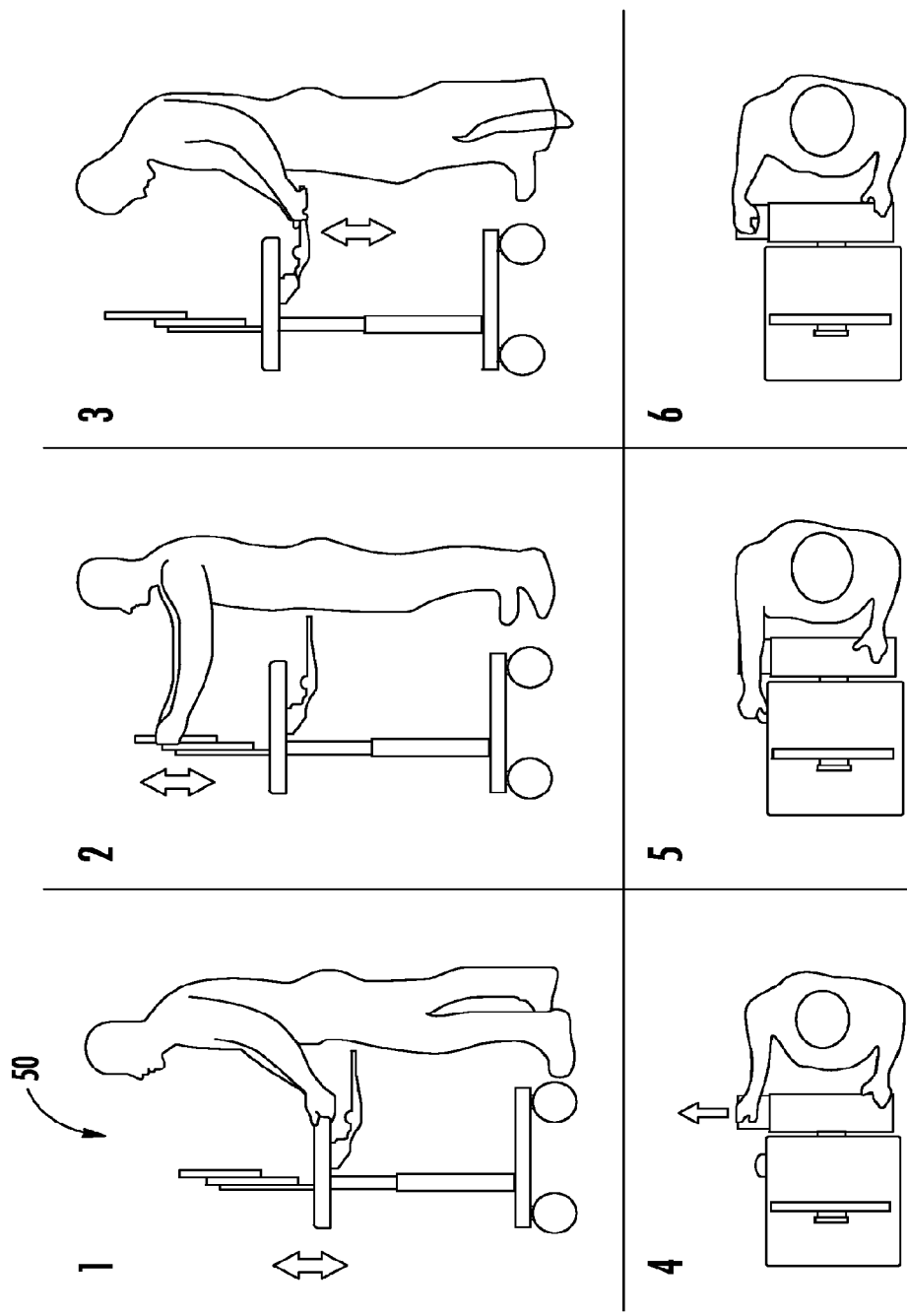
FIG. 13 is a diagram of typical steps required to adjust existing accessory carts.

Moreover, as shown in steps 4 through 6 of FIG. 13, existing accessory carts typically have a separate platform that swivels or slides out from the work platform for supporting a computer input device, such as a mouse. However, the separate platform not only enlarges the footprint of the accessory cart, but also forces the user into a poor ergonomic position since the user's hand must reach away from the work platform 106 and the user's body. Additionally, if left extended from the work platform after use, it is subject to being hit, knocked, and broken either when the accessory cart is being moved or when another person passes by the accessory cart.

As shown in an embodiment depicted, for example, in FIG. 9A, the keyboard support surface 116 is sized to fit the keyboard 117 and a mouse 118 side-by-side, thereby functioning as both a keyboard platform and a mouse platform.

Figure 37:
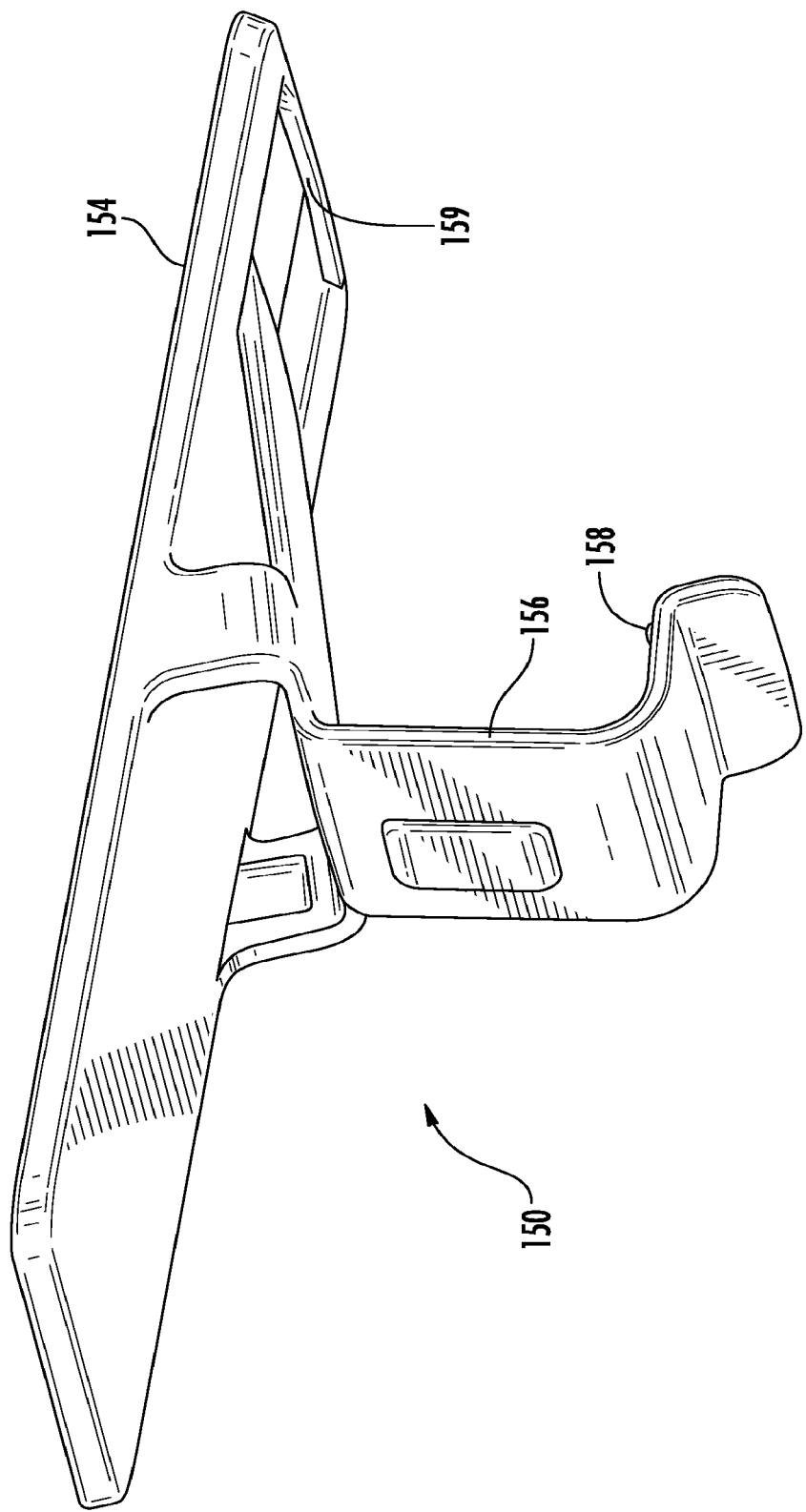
FIG. 37 is a perspective view of an embodiment of a computer input device platform.
Figure 38:
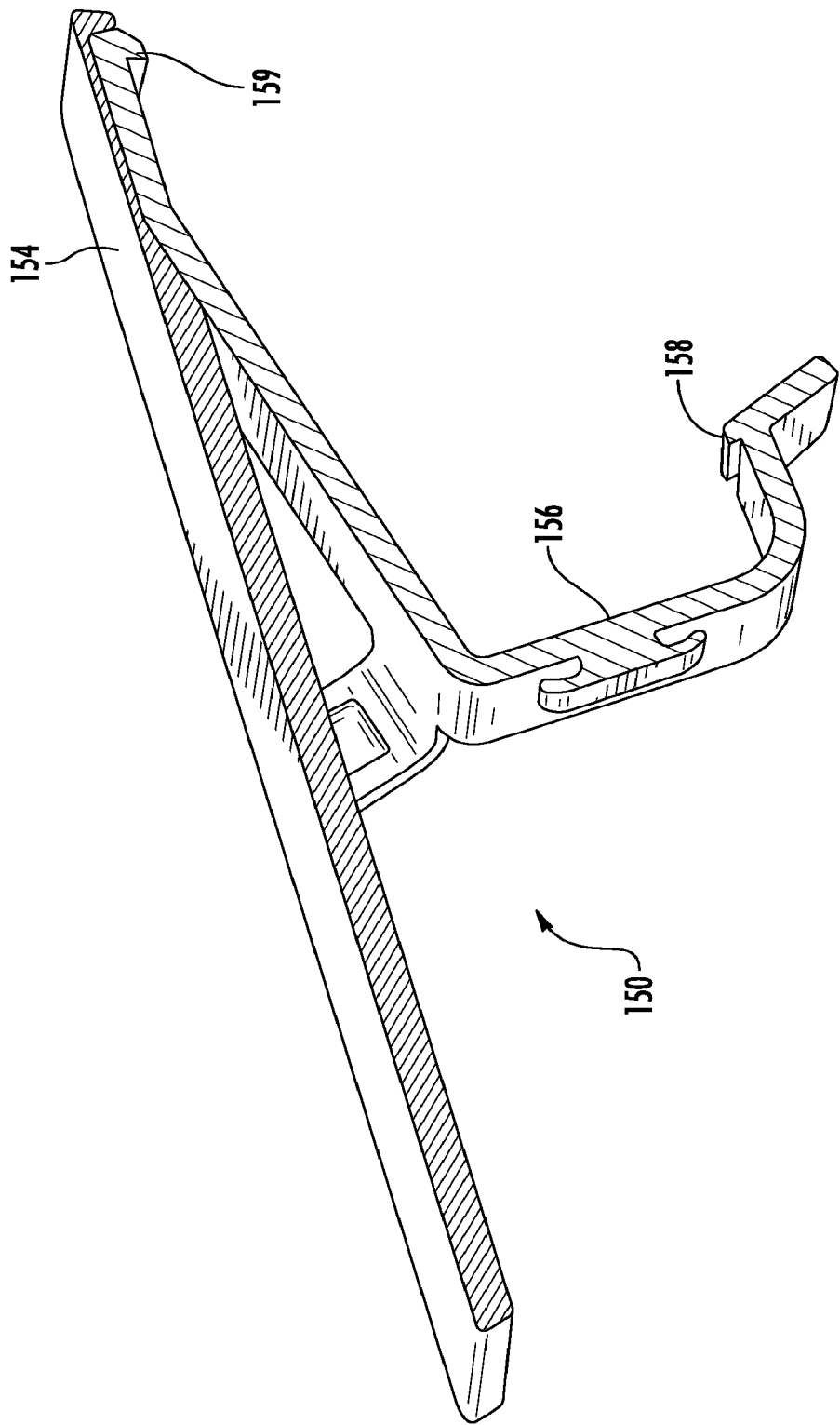
FIG. 38 is a cross-sectional view of the computer input device platform of FIG. 37.

Alternatively, in another embodiment, as depicted in FIG. 10A and in more detail in FIGS. 37 and 38, a computer input device platform 150 is slidably attached to the work platform 106 so that it can be adjusted for right-hand or left-hand use. Rather than extend from a side of the work platform 106, the computer input device platform 119 attaches near the front the work platform 106, in a groove 550 formed in the top and/or a groove 552 formed in the bottom surface of the work platform 106, and is slidable along the front edge of the work surface 108 at most to the right and left edges of the work platform 106 to maintain a small footprint, ensure that a user maintains proper ergonomic positioning by operating the mouse 118 within the user's shoulder width, avoid damage to the computer input device platform 119, and to eliminate a user having to store the mouse 118 after each use (See FIGS. 30A to 30D, 32, 34 and 36). As best seen in FIGS. 37 and 38, the computer input device platform 150 includes a clamping means that includes a first protrusion 159 that extends in a first direction, which is substantially opposite that of a platform surface 154 on which the mouse 118 rests, a substantially C-shaped extension 156, which protrudes from the underside of the platform surface 154, and a second protrusion 158 that extend from the C-shaped extension 156 toward the first protrusion 159. The computer input device platform 119 is comprised of a transparent and/or semi-transparent material, such as plastic or glass that is clear or at least partially clear, to allow to the user to view the keyboard 117 and the control panel 130 at the front of the work platform 106. Additionally, the computer input device platform 150 can include a textured, semi-transparent surface to create friction and ensure the mouse 118 does not slide off of the platform 119.

In a further embodiment, as shown in FIGS. 35 and 36, an alternative computer input device platform 119 can be removably secured to the keyboard support surface 516 by magnets, or any other known securing means, which secure the computer input device platform 119 to the keyboard support surface 516, but which also allows the computer input device platform 119 to be removed from the keyboard support surface 516 if sufficient force is applied. Thus, the computer input device platform 119 can be moved from one desired location on the keyboard support surface 516 to another desired location on the keyboard support surface 516 and secured once again to the keyboard support surface 516. In the embodiment, magnets can be located on or in the computer input device platform 119 and/or the work platform or the keyboard support surface 516. Both of the computer input device platforms 119, 150 can be installed at the same time to allow a user to place the mouse 118 on either desired platform 119, 150 or, if desired, one of the platforms 119 or 150 can be removed.

Figure 11B:
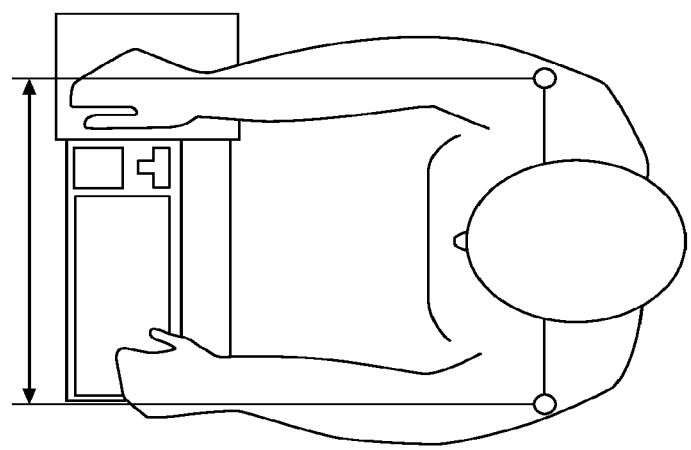
FIG. 11B is a diagram of the ergonomic range for a user's horizontal reach relative to the accessory cart of FIG. 1.

Thus, the exemplary accessory cart 100 provides improved ergonomic positioning of the keyboard 117 and the mouse 118 with either embodiment shown in FIGS. 9A and 10A. As best shown in FIG. 11B, both the keyboard 117 and the mouse 118 are positioned within the shoulder width of the user. Additionally, as shown in FIGS. 9B, 10B, 30A-30D, 33 and 34C, the keyboard platform 110, 510 is fixed at a negative angle so as to ensure the user's forearm remains within the ergonomic region 76 (as described in further detail below) while typing. The keyboard work platform can be orientated between 0 degrees and −45 degrees. Preferably, however, the exemplary keyboard platform 110 is positioned at about a 10° decline from the horizontal position (i.e., negative 10 degrees) and about 3 inches below the work platform 106 so that the handle 114 is as far as possible (laterally) from the base 102 to provide ample room for the user's toe clearance while walking.

Figure 11A:
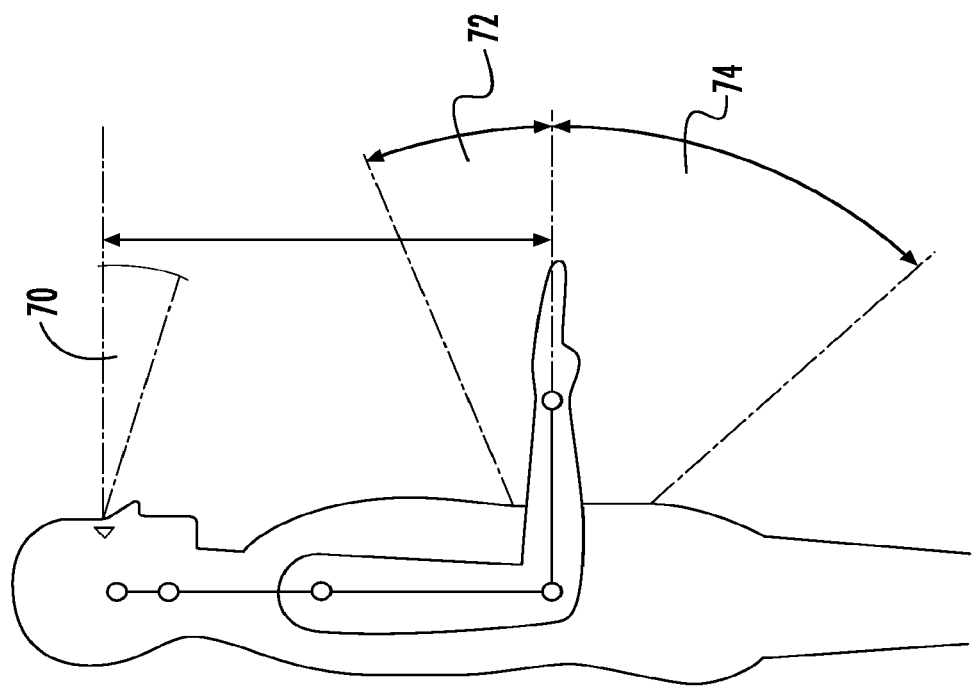
FIG. 11A is a diagram of the ergonomic range for a user's sight and vertical reach relative to the accessory cart of FIG. 1.

In a further embodiment, the accessory cart 100 includes an automatic height adjustment mechanism that automatically adjusts the height of the work platform 106 and/or the monitor 124 to a predetermined ergonomic positioned associated with an input height. As used in the specification and claims, "automatically adjustable" is defined as being moveable by a non-manual force to a predetermined position, the predetermined position being based on information obtained by or contained within a device such as a controller, processor, computer, or database. As used in the specification and claims, "automatically adjusting" is defined as moving by a non-manual force to a predetermined position, the predetermined position being based on information obtained by or contained within a device such as a controller, processor, computer, or database. The predetermined ergonomic position of the height adjustment mechanism is based upon the average distance between the eyes and elbows of a person having the input height. Referring to FIG. 11A, an ergonomic position is one in which the user does not have to strain his/her neck to view the monitor 124 and maintains his/her forearm at the illustrated horizontal position or within the region 72 for mousing and at the illustrated horizontal position or within the region 74 for typing. As depicted in FIG. 11A, the "horizontal position" of the forearm is when the forearm is at approximately a 90° angle from the upper arm. Thus, the optimal position of the monitor 124 is at or slightly below eye level, as indicated by the region 70. The mouse 118 or other computer input device should be positioned so that the user's forearm can be maintained in the horizontal position or slightly inclined within about 20° relative to the horizontal position. The keyboard 117 should be positioned so that the user's forearm can be maintained in the horizontal position or declined within the 45° decline relative to the horizontal position. The "ergonomic negative angle" referenced above is derived from this 45° decline. To maintain the user's forearm within the region 74, the keyboard 117 should be tilted at a negative angle relative to the user, i.e., the end of the keyboard 117 closest to the work platform 106, and thus furthest from the user, should be lower (i.e., closer to the ground) than the end of the keyboard 117 closest to the user.

Thus, the keyboard platform 110 is configured to support the keyboard 117 at an ergonomic negative angle. The keyboard platform 110 and the keyboard support surface 116 are fixed at a negative angle relative to the work platform 108. As shown in FIGS. 9B and 10B, for example, the user's elbows are aligned with the work platform 108. Therefore, if the keyboard platform 110 is fixed at a pre-determined ergonomic angle relative to the work platform 106, it is only necessary to adjust the height of the work platform 106 to fit each particular user to ensure the correct ergonomic positioning in terms of user reach.

In another exemplary embodiment, the automatic height adjustment mechanism can electronically adjust both the height of the work platform 106 and the height of the monitor 124. As the height of the work platform 106 is adjusted, the monitor 124 moves with the work platform 106 since it is attached to the work platform 106 by the monitor mount 121. Additionally, as described above, the monitor arm 125 allows for height adjustment of the monitor 124 relative to the work platform 106. Thus, the height of the monitor 124 can also be adjusted independent from the adjustment of the work platform 106. However, the monitor mount 121 for the accessory cart 100 is specially designed to support the monitor 124 at a predetermined neutral position, which is about midway between the ergonomically recommended position for the tallest users (95 percentile male) and the shortest users (5 percentile female). This position is considered safe for all users because it eliminates the possibility of extreme mal-adjustment, although it is not optimized for each user. Therefore, if the work platform 106 is positioned at a correct ergonomic height, the monitor 124 is more likely to also be positioned at safe (or at least less poorly adjusted) height. Thus, the accessory cart 100 reduces the need for independent adjustment of the monitor 124 relative to the work platform 106.

As shown in FIG. 8, the work platform 106 can include a control panel 130 that is in communication with a processor (not shown) and the processor in turn is in communication with a database that contains a list of possible user heights and the predetermined ergonomic positions associated with each of the possible heights. The processor and the database can be located within the base 102, the housing element 104, or the work platform 106 of the accessory cart 100. Alternatively, the processor and/or the database can be located remote from the accessory cart 100, in wireless communication with each other and/or the control panel 130. The processor is also in communication with a motorized lift mechanism located within the base 102 and/or the housing element 104 of the accessory cart 100.

The control panel 130 can include a touch screen with a series of number scrolls, a slide bar, a number pad, buttons, knobs or other suitable means accessible to the user for the input of the user's height. Alternatively, the control panel 130 can include a number of pre-set height options selectable via a touch screen, buttons, or knobs. The pre-set height options could include specific heights (e.g., 5'1", 5'2", 5'3", etc.) or height ranges (e.g., a button for heights in the range of 4'8" to 5'0", a button for heights in the range of 5'1" to 5'3", a button for heights in the range of 5'4" to 5'6" and so forth). In another alternative embodiment, each user has an access ID, with his/her height information associated therewith, identifiable by the control panel 130 through, for example, swiping an access ID card or inputting an access ID code. This could also be tied to the login or other security feature (e.g., a biometric ID) which identifies the user and allows access to the computer to which the monitor 124 is connected. Near field communication technology, such as embedded within a user's cellular phone, can also allow the accessory cart to recognize the identity of a user and obtain the height information associated with that user.

In yet another alternative embodiment, the height of the work surface 108 can be communicated to the user as the height of the work platform 106 changed, through, for example, a display screen showing numbers scrolling, an icon indicating height increase, a slide bar, or a display of changing numbers indicating the height change.

In a further embodiment, the control panel 130 can further include a "sit" height adjustment option the user can select through, for example, a button, scroll feature, slide or other interface, to adjust the work platform 106 to a typical desk level (see FIG. 12).

In an even further alternative embodiments, the accessory cart 100 can be equipped with a sensor (e.g., retinal, sonar, laser, IR, motion, position, and heat detecting sensor, a camera, or other measuring devices) operable to detect a measurable aspect of a user, such as the height of a user, and communicate the detected information to the processor. The sensor(s) can be coupled to the work platform 106, monitor mount 121, or the monitor 124.

As an example of a use of the accessory cart 100, when a user approaches the accessory cart 100, the user inputs his/her height at the control panel 130. The height information is communicated to and received by the processor, which communicates with the database to obtain the predetermined ergonomic position information associated with the user's input height. Based upon the received predetermined ergonomic position information, the processor communicates an instruction to the motorized lift mechanism to adjust the work platform 106 to the predetermined ergonomic position. Accordingly, the work platform 106 (and the monitor 124 movable therewith) automatically adjusts to a height that is ergonomic for the user.

In a further exemplary embodiment, the height of the monitor 124 relative to the work platform 106 can also be adjusted using a motorized height adjustment mechanism that monitors specific motion to account for differences between the eyes and elbows of people with varying height (taller people tend to have longer torsos). Thus, like the motorized lift mechanism for adjustment of the work platform 106, the motorized monitor lift mechanism can be in communication with the processor and operable to further control the movement of the monitor 124 relative to the work platform 106 upon receipt of instructions from the processor (based on the predetermined ergonomic position information). Anthropometric data could be used in determining the amount of monitor height specific adjustment. This data could be stored separately in the database from height adjustment data for the work platform 106.

Figure 6:
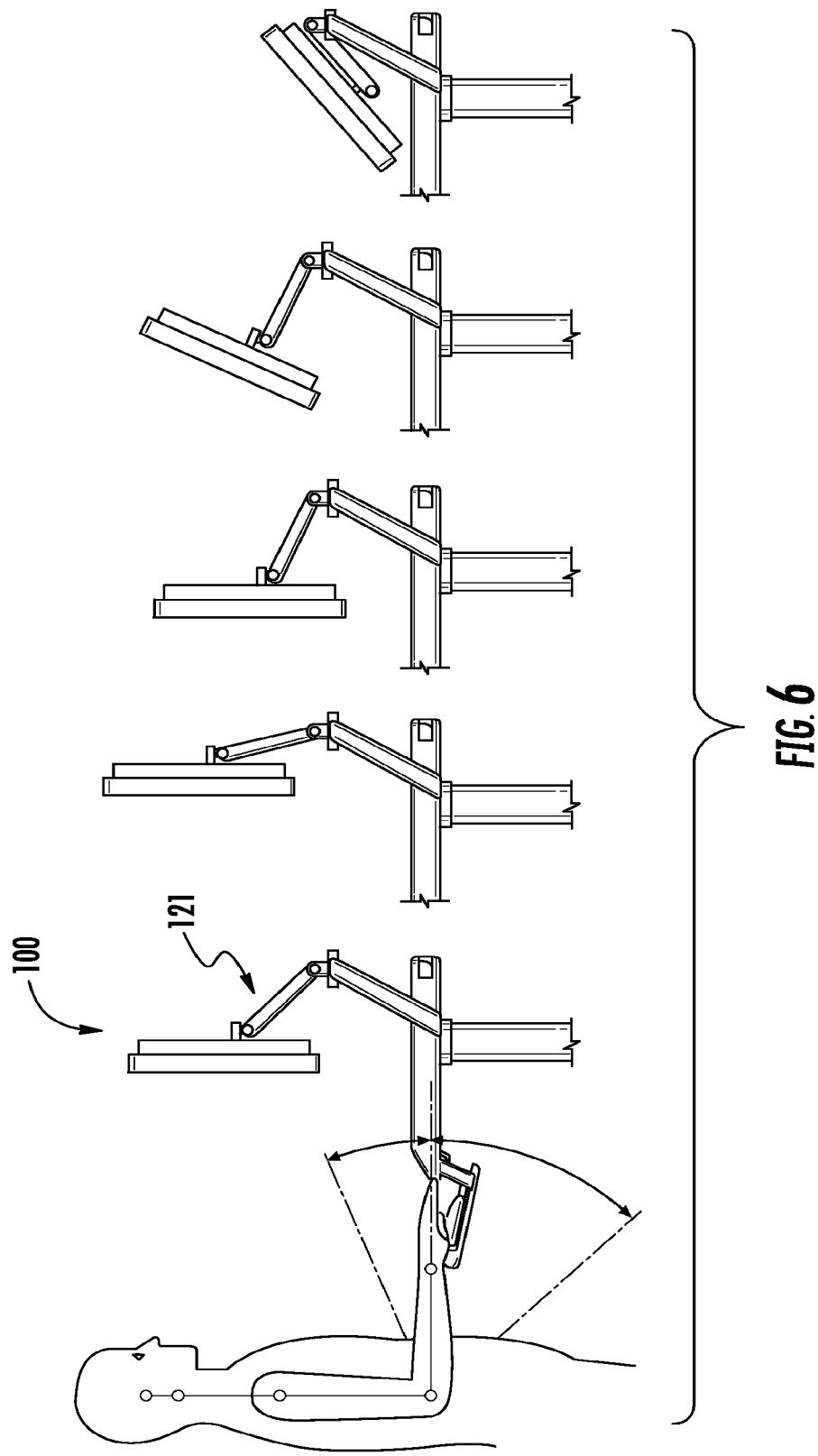
FIG. 6 is a diagram of multiple side views of the accessory cart of FIG. 1, illustrating various configurations of a monitor mount.
Figure 7C:
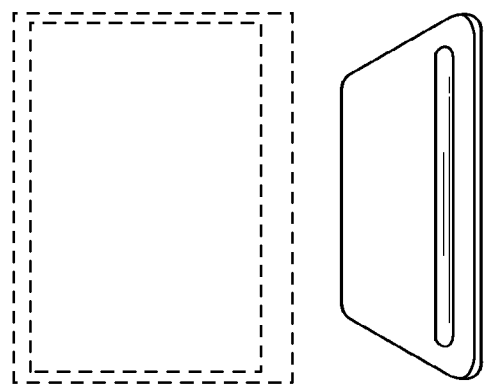
FIGS. 7A to 7C depict ergonomic challenges associated with mounted monitors.
Figure 7B:
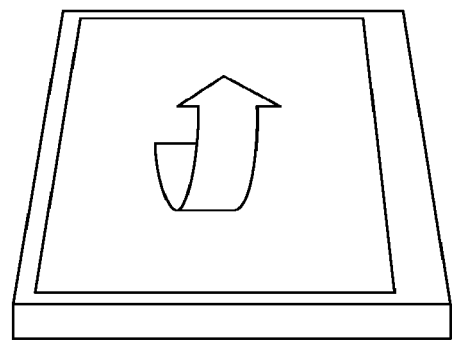
Figure 7A:
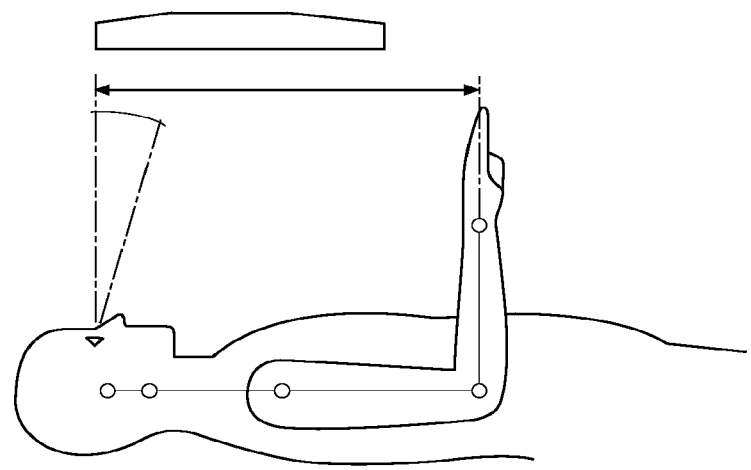

Any automated or default positioning could include the possibility for the user to position the monitor out of the recommended ergonomic range to accommodate the use of bi-focals, as shown in FIG. 6. If the monitor 124 is out of the recommended ergonomic position, the cart 100 automatically adjusts the monitor 124 back to the neutral position the next time the cart 100 is adjusted. This ensures that poor ergonomic positioning is not the default for the cart 100. In another embodiment, the accessory cart 100 can allow a user to make adjustments to the predetermined platform height or the predetermined monitor height in order to suit the user's personal preferences. These adjustments to the predetermined heights can then be stored in a database for future selection by that user.

Figure 14:
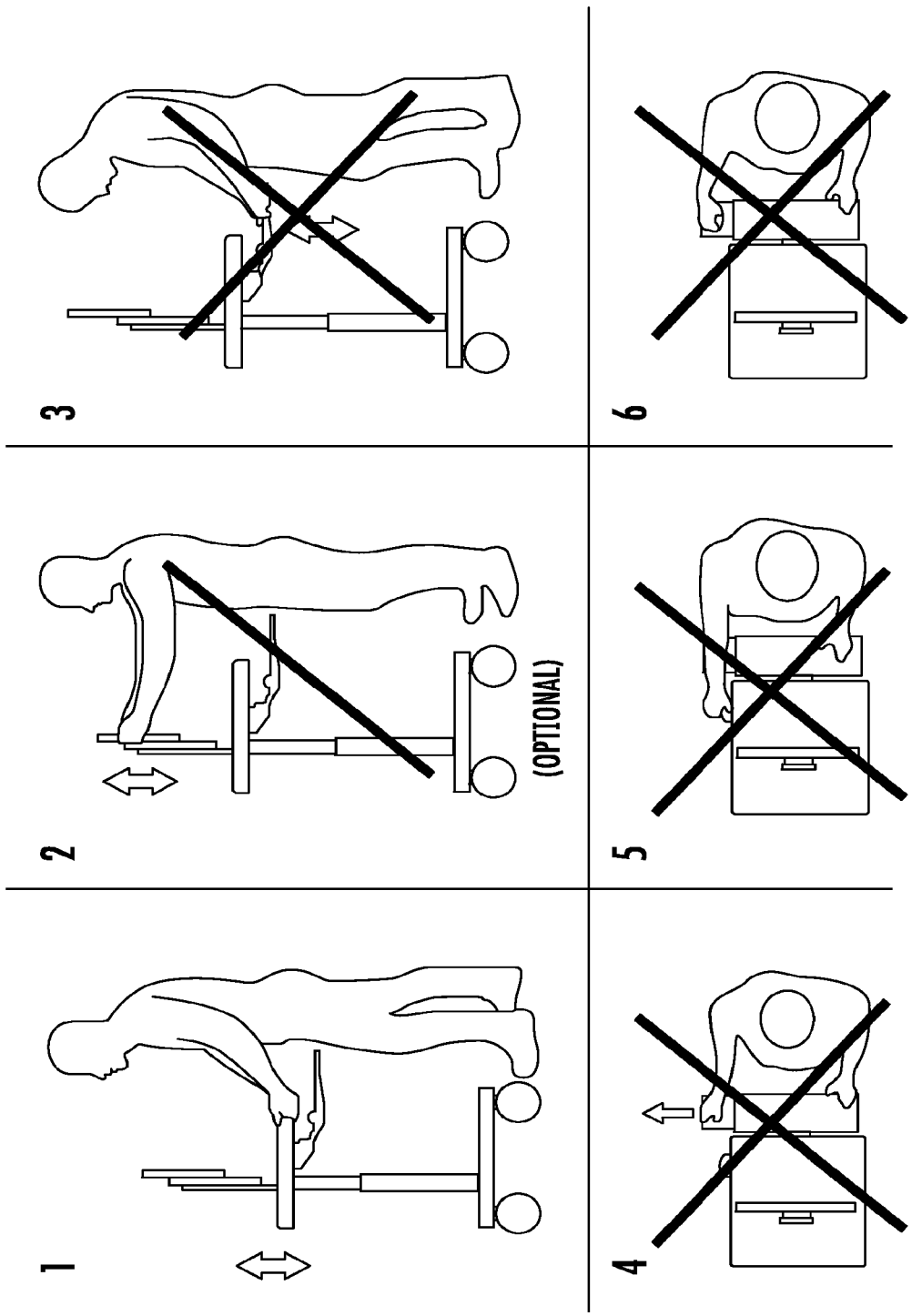
FIG. 14 is a diagram of steps of FIG. 13 for adjusting an accessory cart in accordance with the present invention.

Accordingly, the exemplary accessory cart 100 eliminates many of the steps required to adjust a typical existing accessory cart 50 to an ergonomic position. For example, referring to FIG. 13, the height of the work platform of the exemplary existing accessory cart 50 is manually adjusted at step 1; the height of the monitor is further adjusted manually at step 2; the keyboard platform is adjusted at step 3; the mouse platform is laterally extended at step 4; and the mouse positioned onto the mouse platform at steps 5 and 6. However, as shown in FIG. 14, a significant number of these steps are either eliminated or simplified with the accessory cart 100. Instead of manually adjusting the height of the work platform 106, or pressing a button until an estimated ergonomic position is reached, the accessory cart 100 automatically moves to an ergonomic position based on the user's height, which can be input or detected at step 1. Since the monitor mount 121 is specially designed to support the monitor 124 at the predetermined neutral position, further adjustment of the monitor 124 relative to the work platform 106 (at step 2) is no longer required, although still an option with the accessory cart 100. Further, with the keyboard platform 110 (and computer input device platform 119), the keyboard 117 and mouse 118 are positioned in a desired ergonomic range without the need for the additional adjustment in steps 4 through 6.

Figures 15A, 15B:
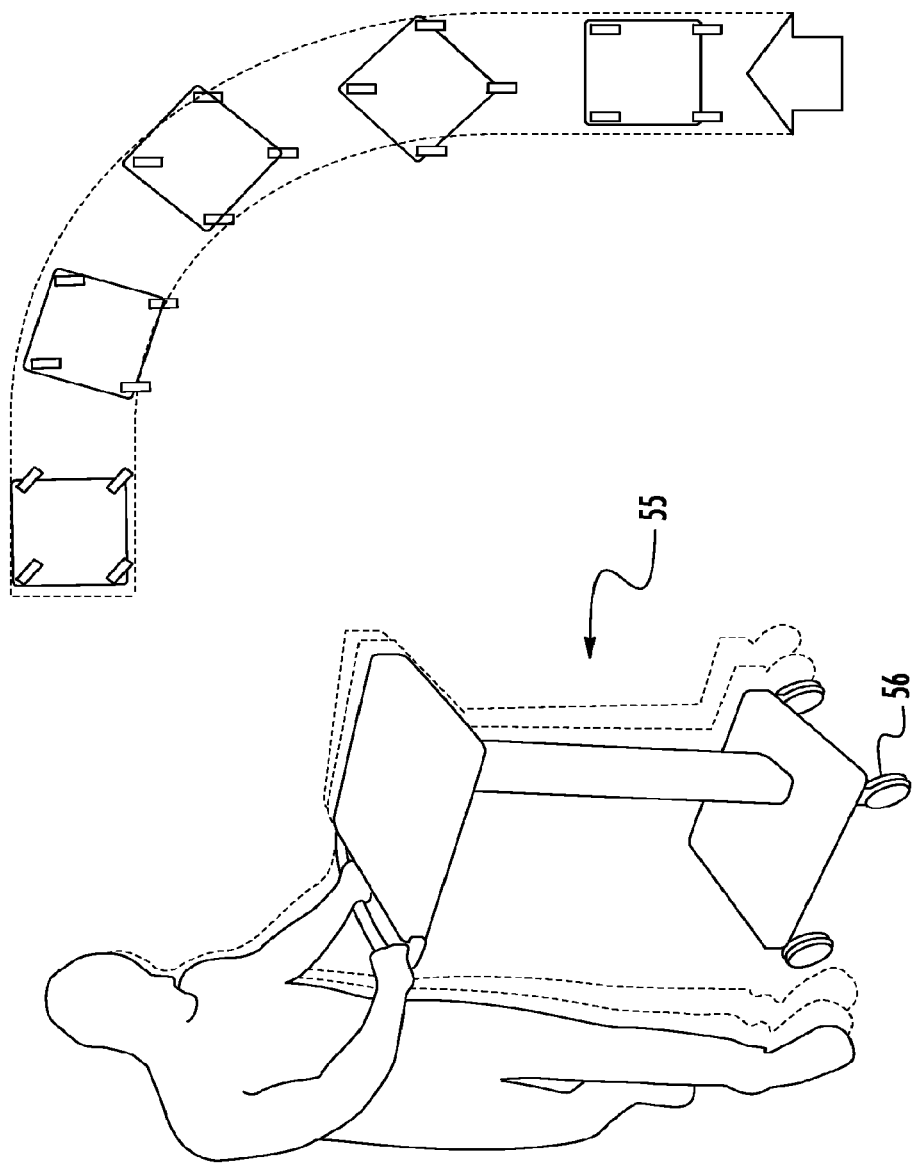
FIGS. 15A and 15B are illustrations of a user pushing an existing accessory cart and the track of an existing accessory cart taken when pushed by a user.

In addition to the ergonomic advantages discussed above, the exemplary accessory cart 100 also has advanced control and mobility. Referring to FIGS. 15A and 15B, existing mobile accessory carts 55 are typically equipped with only four free-rotating swivel casters 56, which permit the user to maneuver the cart around corners, or push it out of the way if necessary, but makes the cart difficult to steer. In particular, the momentum of the cart may be a problem if the cart is moved quickly, as the cart may become difficult to stop or turn. In addition, the carts 55 are difficult to push in a straight line, as the four swivel casters may cause the cart to move slightly from side to side as it is pushed, especially if the floors are uneven. As shown in FIGS. 16B to 16E, an exemplary base 102 includes four swivel casters 140 and a tracking wheel 144 deployable to support the base 102 as close to its center as possible to balance the weight of the cart 100 and control the movement of the cart 100 from the center of gravity. Thus, the cart 100, which rotates about the wheel 144 (when deployed), turns almost about its own center of gravity, providing better control and maneuverability. Additionally, the majority of the weight of the cart 100 is located low, close to the wheel 144, for increased control.

Referring to FIG. 16C, the tracking wheel 144 is biased in a first position, in which the wheel 144 is retracted within a cavity 146 in the underside of the base 102 and does not engage a floor surface. Through a wheel release mechanism, the wheel 144 is deployed to second tracking position, in which the wheel 144 engages a floor surface, as show in FIG. 16D. As depicted in FIG. 16A, a wheel release switch 148 is disposed along the underside of the keyboard support bar 114 so that when the keyboard support bar 114 functions as the cart handle, the user's hands (inserted through the gap 120) engage the wheel release switch 148 as the user grasps the handle 114 to maneuver the accessory cart 100. When the switch 148 is engaged, by the user maintaining a grip in the switch 148, the wheel 144 is driven down to the floor surface by an electric motor housed within the base 102 and the wheel 144 is held against the floor via a primary torsion spring that allows the wheel 144 to passively travel approximately 8 mm below the nominal floor and back within the cavity 146 (approximately 25 mm about the nominal floor), while applying full contact force. This allows the wheel 144 to work across troughs and over bumps. The wheel motor applies the downward motion to the wheel 144 via a control wire that operates a lever that rotates a shaft, which lowers the wheel 144. A secondary torsion spring lifts the wheel back within the cavity 146 when the motor is reversed. The secondary spring maintains tension in the control wire. Additionally, in an embodiment, the motor can operate the wire via a pulley that is shaped to initially operate at high speed and low force to quickly take the wheel 144 to the floor and then operate at low speed and high force to compress (wind up) the primary spring. This optimizes the speed of operation and wheel contact force for a given motor size. When the switch 148 is released by the user, the wheel retracts back within the cavity 146. Thus, as shown in FIG. 16E, greater control and mobility are achieved, almost automatically, through the deployment of the tracking wheel 144 by merely grasping the cart handle 114 to maneuver the cart 100, which in turn allows the cart 100 to be easily moved out of the way when desired.

As illustrated in FIG. 8, the control panel 130 can include, in addition to the height input display, a battery life indicator and a wheel tracking indicator, which informs the user as to whether or not the wheel release switch 148 is engaged and the wheel is "tracking" along the floor.

As best shown in FIGS. 16C-D, the base 102 can include a front inclined surface 103, which functions as a footrest for the user while in a standing position and also provides additional toe/stride clearance.

Referring to FIGS. 17A to 17D, the exemplary accessory cart 100 is designed to be used with a variety of wired or wireless computing solutions, including but not limited to a laptop housed within the work platform 106 (see FIG. 17A) or within a holder 151 at the back of the cart 100, a CPU housed within a CPU holder 153, (e.g., at the base 102 of the cart 100), or a thin client solution (see FIG. 17D). The monitor 124, keyboard 117, and mouse 118 can be connected to the computer solution through any suitable means known in the art and the computer solution can be connected to a power supply housed within the cart 100, (e.g., within the base 102), by any suitable means. As shown in FIG. 18A, the housing element 104 can be at least partially hollow to provide a cable management channel for cables connecting from a hub 134 in the base 102 (see FIG. 18C). An additional hub 138 and/or a power cord reel 136 can be housed within the work platform 106 (see FIG. 18B) or within other locations on the accessory cart, (e.g., within the base 102). This helps with infection control issues (cords are difficult to clean), and is an aesthetic improvement. Another feature aiding with infection control is the fit between the outer surface of the height adjustable housing element 104 within the cavity 146 of the housing element 104, as shown in FIGS. 19A-B.

Figure 21C:
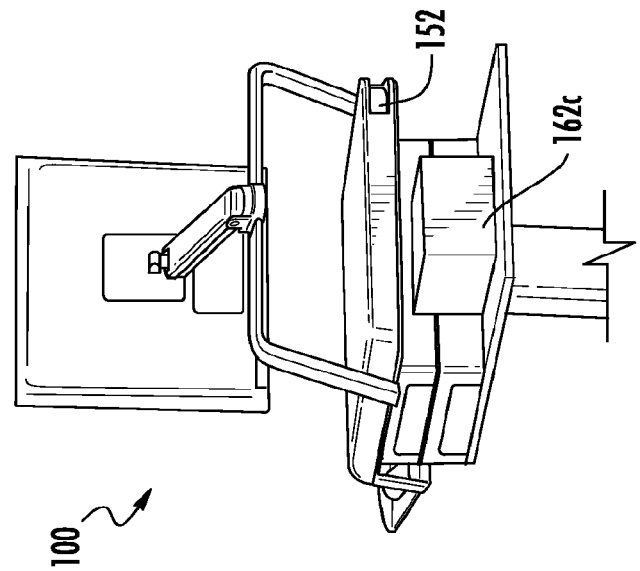
FIG. 21C is a partial, rear side perspective view of the accessory cart of FIG. 1, shown with yet further alternative storage options and accessories.
Figure 21B:
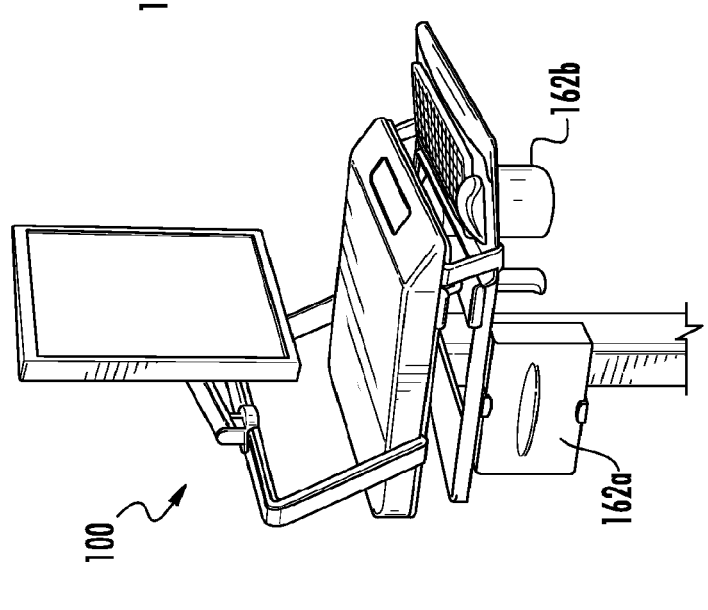
FIG. 21B is a partial, front side perspective view of the accessory cart of FIG. 1, shown with alternative storage options and accessories.
Figure 21A:
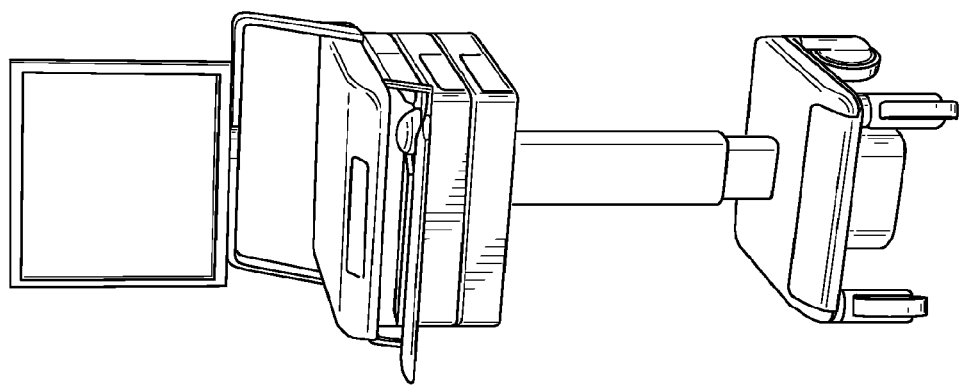
FIG. 21A is a front perspective view of the accessory cart of FIG. 1, shown with additional storage options.

As shown in FIGS. 20A-B, the exemplary accessory cart 100 can further include a work surface 160 that extends laterally for additional workspace and storage. The work surface 160 can be stored within the work platform 106 during nonuse. FIGS. 21A-C illustrate various embodiments of additional storage drawers (FIGS. 21A and 21C), ledges (FIGS. 21B and 21C) and other accessories 162A to 162C, such as removable side bins, scanners, cup-holders, etc.

The mobile accessory cart 100 can include any suitable power supply, including a rechargeable battery. Keeping the battery on mobile accessory carts charged is a challenge. Healthcare professionals are very busy, sometimes with life-threatening situations, and do not have the time to focus on keeping the accessory carts plugged in. Since the healthcare professionals usually use any cart available, and do not have one cart assigned to each person, there is no sense of ownership for any particular cart. When the battery runs low, often another cart is used and the cart that is out of power is abandoned. Without power, the carts cannot function and merely take up space. Further, running the battery down too far can also damage the battery life, which means the battery life will depreciate faster in the future and will need to be replaced more often.

Referring to FIGS. 22 and 23, the exemplary accessory cart 100 is depicted as being charged wirelessly, alleviating the problems indicated above with respect to the failure to recharge accessory carts. In FIG. 22, the accessory cart 100 is charged using magnetic induction technology with a receiver 170, which is electrically coupled with a rechargeable battery, for example, within the base 102, on the base 102 communicating with transmitters 172 located within a baseboard 174 or a wallpaper along a wall 175. The positioning of the transmitters 172 allows for re-charging of the battery through induction even if the receiver 170 is not perfectly aligned with the transmitters 172, although the cart 100 should be placed as close to the baseboard 174 as possible for optimal battery charging. In FIG. 23, the accessory cart 100 is charged using resonant inductive coupling technology. Here, the receiver 176 is electrically coupled with the rechargeable battery within the base 102 and is located on the bottom of the base 102 so that the receiver 176 can communicate with daisy-chained transmitters 178 in the floor 180. Alignment of the cart 100 is even less important in this situation in view of the dispersion of the transmitters 178 throughout the flooring 180. As a result, wireless charging solutions, in which transmitters are positioned along the walls and/or flooring of the medical facility, alleviate the problems associated with having to rely on a busy healthcare professional to plug the cart 100 into a wall outlet for recharging of the battery.

Moreover, a motion sensor can be included in the exemplary accessory cart 100 that is operable to detect the presence of a user at the front of the accessory cart 100 and turn on a light positioned on the front underside of the work platform 106 to light the keyboard platform 110.

Furthermore, the exemplary accessory cart 100 can provide ergonomic training to the user, through a presentation device (e.g., a display on the control panel 130, a monitor such as monitor 124, and/or a speaker), on general ergonomic principles, and specific instructions for cart use. In an embodiment, the ergonomic training can be in the form of a presentation such as interactive software, a video and/or audio file, a slide show, or any other suitable medium. The ergonomic training presentation can be stored in the accessory cart 100 (for example, the ergonomic training presentation could be stored in an on-board computer), or the ergonomic training presentation could be stored in a location that is remote from the accessory cart 100, but that is in wireless communication with the accessory cart. In another embodiment, the ergonomic training could be initiated at the request of the user, such as by the user pressing a button or making a selection on the control panel 130, or, in yet another embodiment, the ergonomic training could be initiated automatically upon the accessory cart detecting the approach or arrival of a user. Automatic initiation of the ergonomic training could be particularly desirable in the event that the accessory cart 100 detects that the approaching user is a new user who has not used the accessory cart 100 previously.

In yet an even further embodiment, the accessory cart 100 can have an on-board computer, which is housed within the base 102, housing element 104, or the work platform 106, and used to track information about battery use, battery life, user patterns, use positioning (sit or stand), duration of use, frequency of use, distance traveled, or other relevant information for use by the medical facility IT personnel or facility planners for understanding the use of the accessory cart 100 and future needs, or for future product development. The on-board computer can comprise a micro-controller or the processor described above or can be separate therefrom. The on-board computer can also include a collision detection feature. When adjusting the height of the work platform 106, the monitor 124, or other component of the accessory cart 100, the work platform 106, monitor 124, or other component could collide with an external object, such as a desk or shelf. Upon such a collision, the on-board computer can detect the collision (e.g., such as by detecting changes in electrical current drawn by the motor as the motor strains against the external object), stop the height adjustment movement, and then reverse the height adjustment movement for a short distance, such as a distance of one inch. The on-board computer can be capable of other functions as well, such as facilitating wired or wireless communication between components or other desirable functions.

Figure 26:
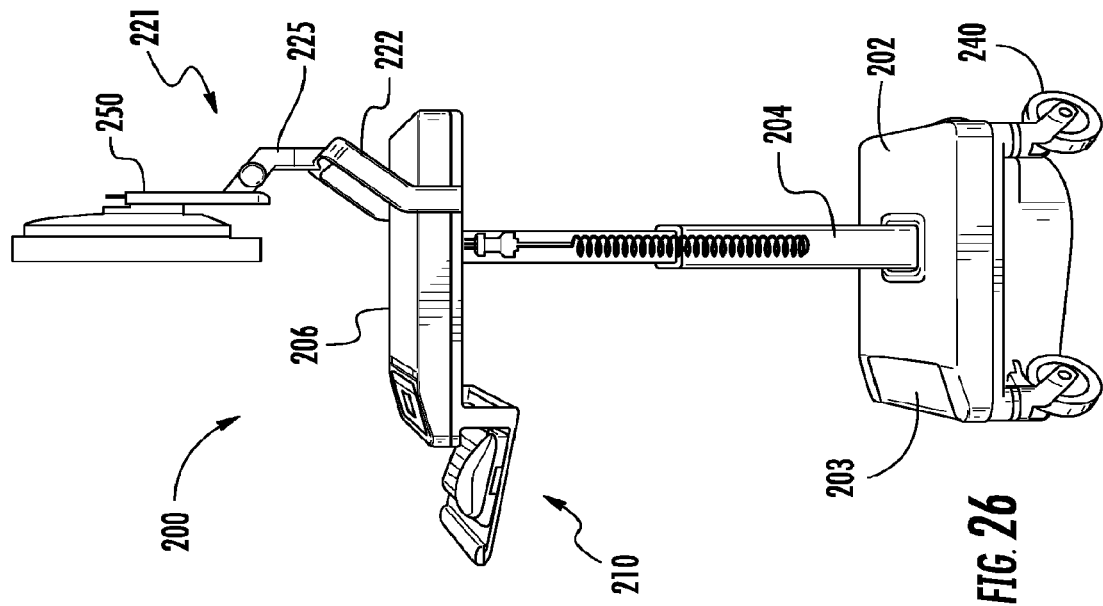
FIG. 26 is a side view of the accessory cart of FIG. 24.

FIGS. 24 to 26 illustrate another exemplary accessory cart 200, wherein parts common with the accessory cart 100 are denoted by like reference numerals increased by 100. In this embodiment, the monitor mount 221, which aids in the monitor 224 being able to be raised above the work platform 206, has a different structure as compared to the monitor mount 121 depicted, for example, in FIG. 1. FIGS. 24-26 should not be construed as limiting the monitor mount 221 structurally as the monitor mount 221 and can take many different forms. As shown in FIGS. 24 to 26, the monitor mount 221 includes an adjustment mechanism 250 (e.g., a Universal Front-End Adjuster manufactured by Humanscale®) attached to the monitor arm 225, which allows for height adjustment of the monitor 224. Exemplary adjustment mechanisms are described in U.S. application Ser. No. 11/150,870, and U.S. application Ser. No. 12/102,312, each of which is hereby incorporated herein by reference in its entirety. The adjustment mechanism 250 allows for additional height adjustment of the monitor 224 independently of the work platform 206 to account for differences between the eyes and elbows of users with varying height. The monitor 225 can be adjusted manually via the adjustment mechanism 250 or automatically via a motorized lift mechanism specific to monitor adjustment and coupled to the adjustment mechanism 250 (as similarly disclosed above with respect to the accessory cart 100). Additionally, in the exemplary embodiment, the monitor arm 225 is rotatably attached to the support frame 222 such that it is operable to rotate about an axis substantially parallel with the housing element 204 to turn the monitor 224 around to allow for patient viewing. In this embodiment, the telescoping aspect of the housing element 204 is reversed such that the larger housing element 204 is connected to the base 202 and the narrow housing element 204 is located closer to the work platform 206.

Although the keyboard platform 210 is slightly different in structure from the keyboard platform 110 of the accessory cart 100, the keyboard platform 210 can take many forms, can be fixed at an ergonomic negative angle, and can function as a handle through.

Figure 27:
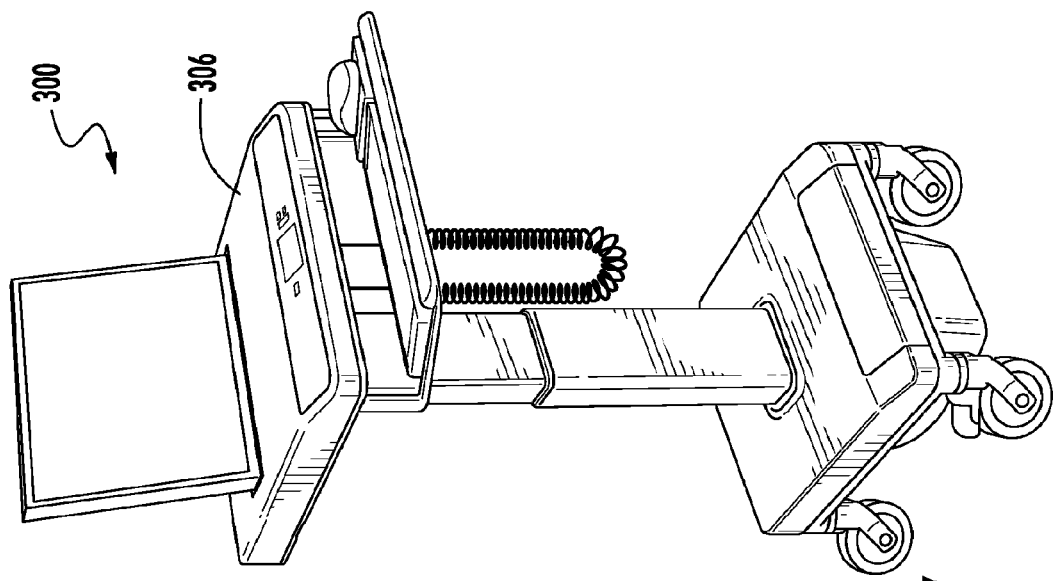
FIG. 27 is a perspective view of an exemplary accessory cart in accordance with a further embodiment.
Figure 28B:
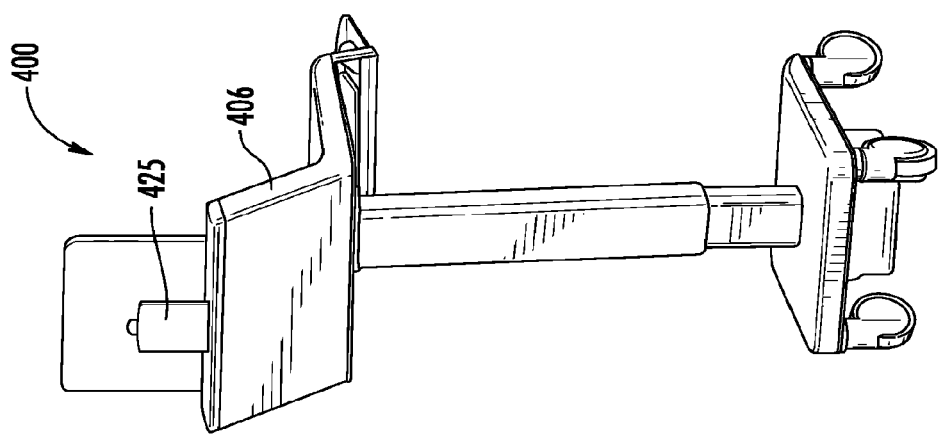
FIGS. 28A and 28B are perspective views of an exemplary accessory cart in accordance with yet an additional embodiment.
Figure 28A:
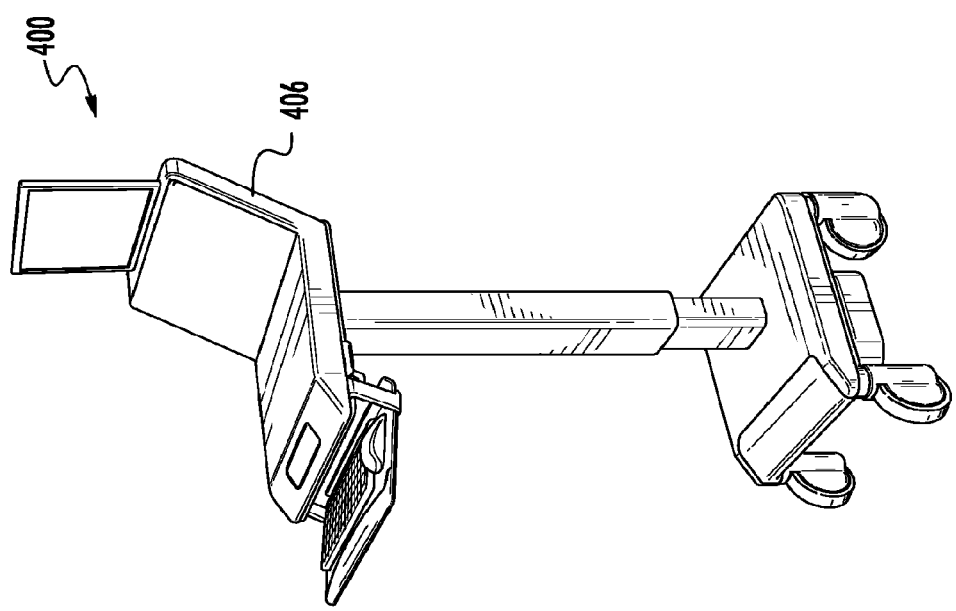

FIGS. 27 and 28 illustrate additional embodiments of accessory carts 300 and 400, respectively, similar to the previously disclosed accessory carts 100 and 200, but with different work platform options. As shown in FIG. 27, the work platform 306 includes a slot within which a monitor rests. The work platform 406 in FIG. 28 extends vertically, in place of a monitor mount, and includes a recess within which the keyboard portion of a laptop is positioned. The laptop monitor extends above the work platform 406 and is supported by a monitor support 425 attached to the work platform 406. The work platform 406 thus elevates the laptop to a predetermined ergonomic position.

Figure 29A:
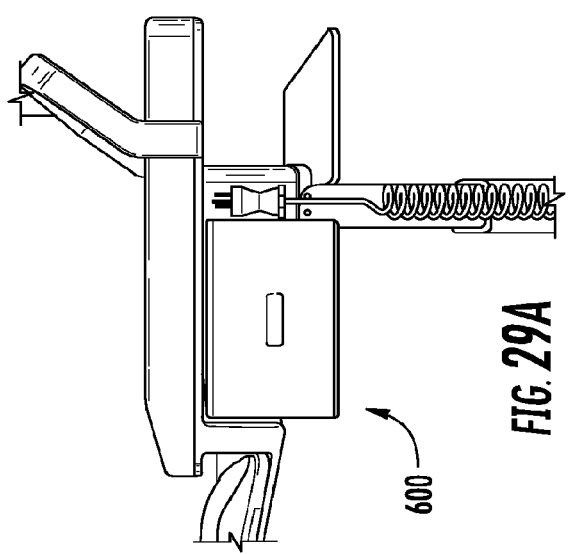
FIGS. 29A to 29C are partial, side views of the accessory cart of FIG. 24, shown with various storage configurations.
Figure 29B:
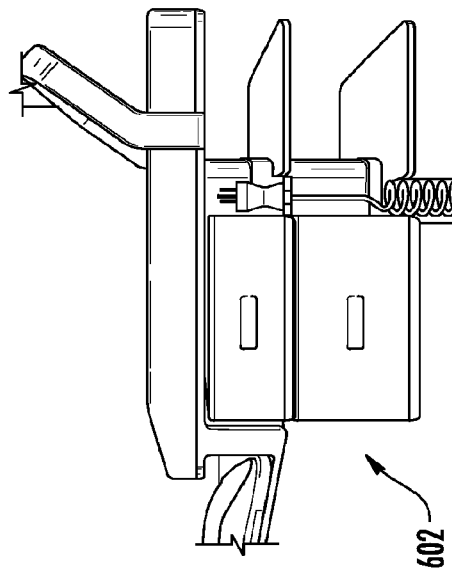
Figure 29C:
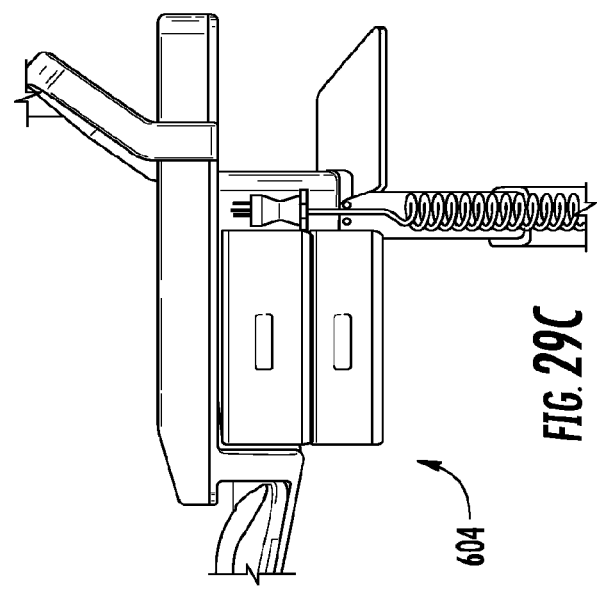

FIGS. 29A-C illustrate additional configurations of storage options 600, 602, 604 (e.g., side drawers, ledges, and cable management) that can be incorporated into any of the accessory cart embodiments.

Alternatively, FIGS. 30A through 30D, 32 and 34 through 36, depict yet another embodiment of an accessory cart 500. As shown, the accessory cart 500 includes a keyboard platform 510 with arms 511 that extend from a work platform 506, a keyboard support surface 516, and a u-shaped support bar 514a that is spaced from the keyboard support surface 516. The keyboard support surface 516, which is located in the keyboard platform 510, is permanently fixed at a negative angle and is not slidable. Instead, the keyboard support surface 516 is fixed at an unadjustable position on the keyboard platform 510 such that a permanent gap 520 is created between the keyboard support surface 516 and the support bar 514. The cart 500 further includes a first groove 550, which is formed in the work surface 508 and a second groove, which is formed in a bottom surface of the work platform 506. The grooves 550, 552 allow the computer input device platform 150 to be slideable laterally about the work surface 506 of the cart 500.

Figure 30A:
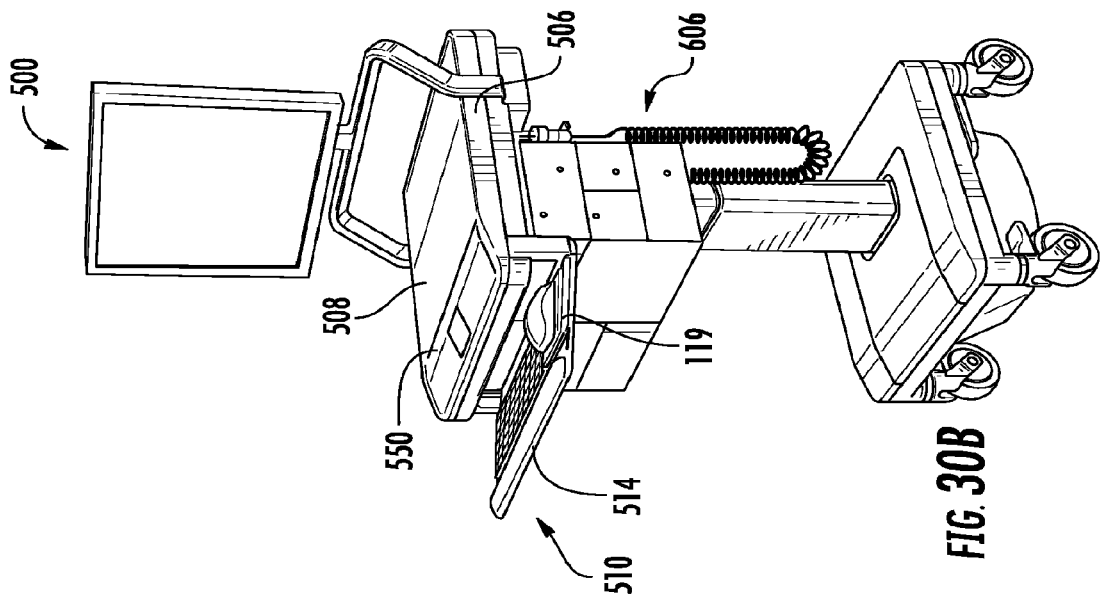
Figure 30B:
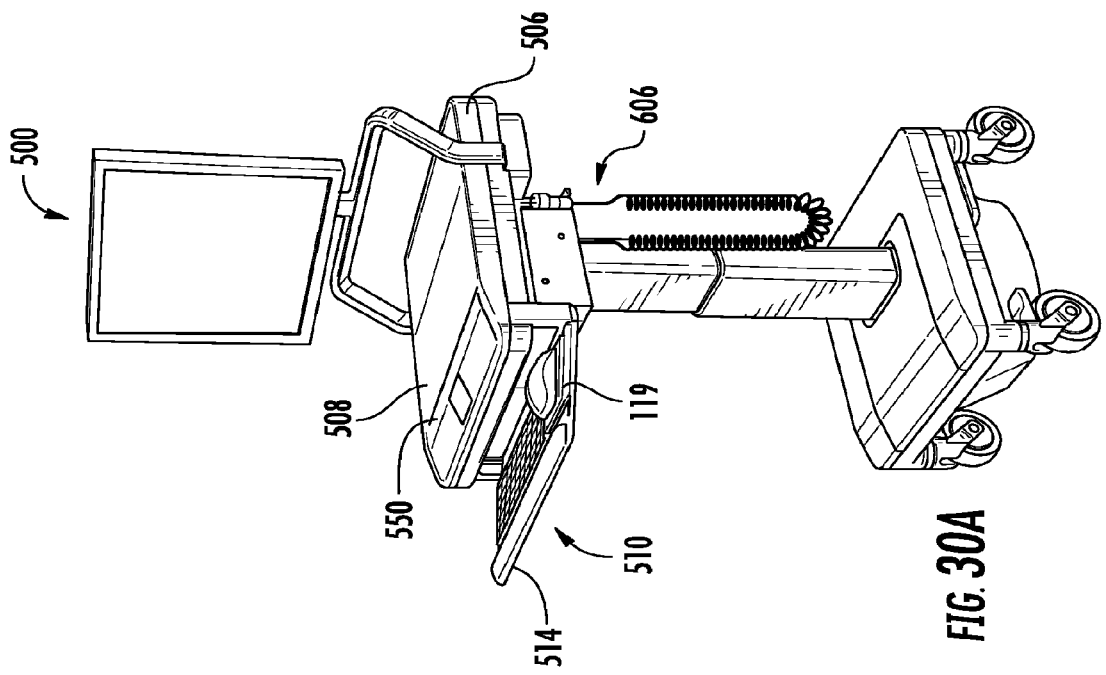

Additionally, FIGS. 30A to 34E include yet additional drawer configurations and storage options 606, 608, 610 and 612 that can be incorporated into any accessory cart embodiment. The accessory carts can be configured with drawers of different sizes and shapes to accommodate various storage needs. As shown in FIG. 30A, a single drawer 610 is incorporated into the cart 500. Alternatively, FIGS. 30B through 30D illustrate the cart 500 configured with multiple drawers 608, 610, 612 of different sizes and shapes. Each drawer can be equipped with a latch mechanism, which secures the drawer in place or locks the drawer to prevent unauthorized access.

Figure 31:
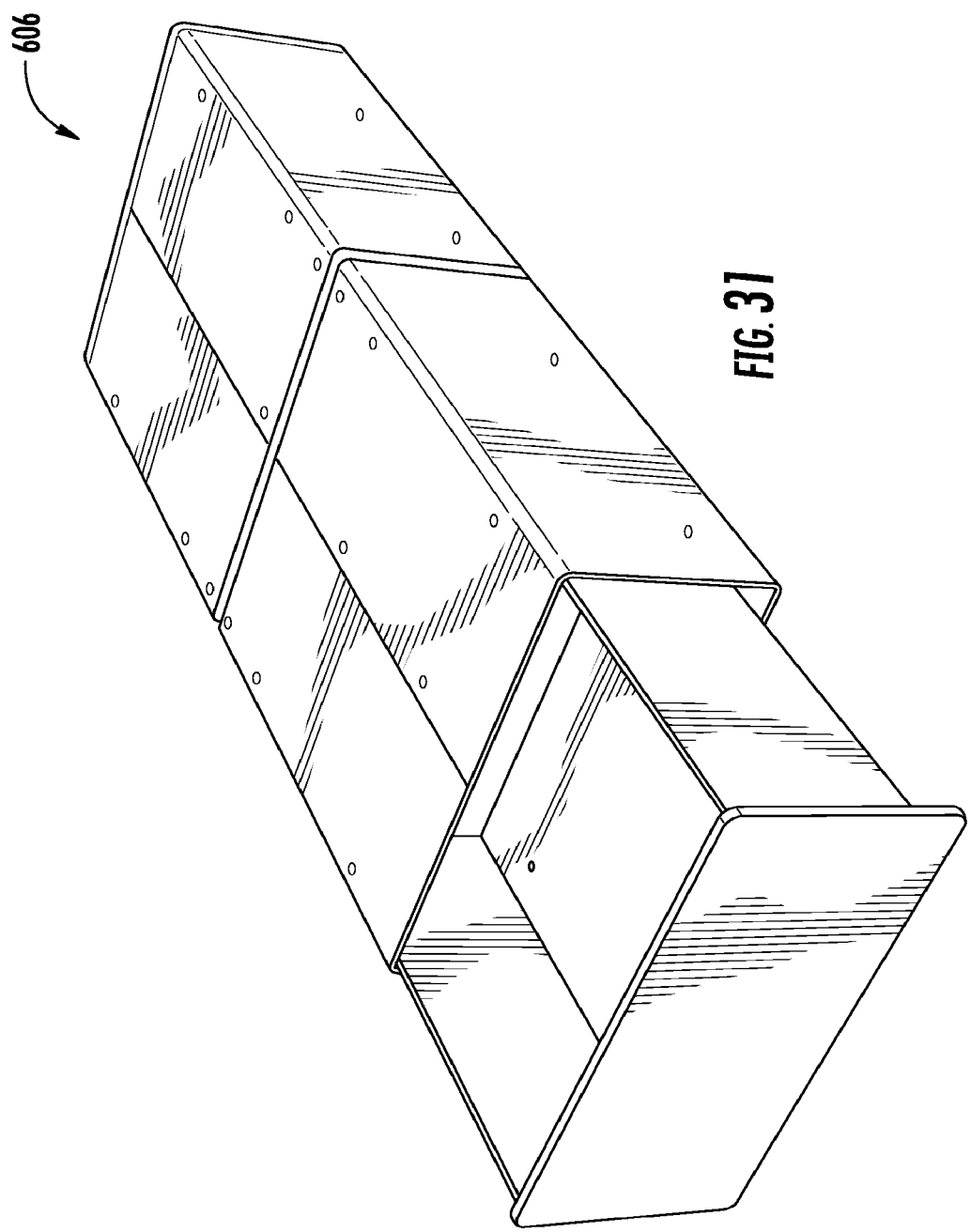
FIG. 31 is a perspective view of a storage option for use with an accessory cart.
Figure 32:
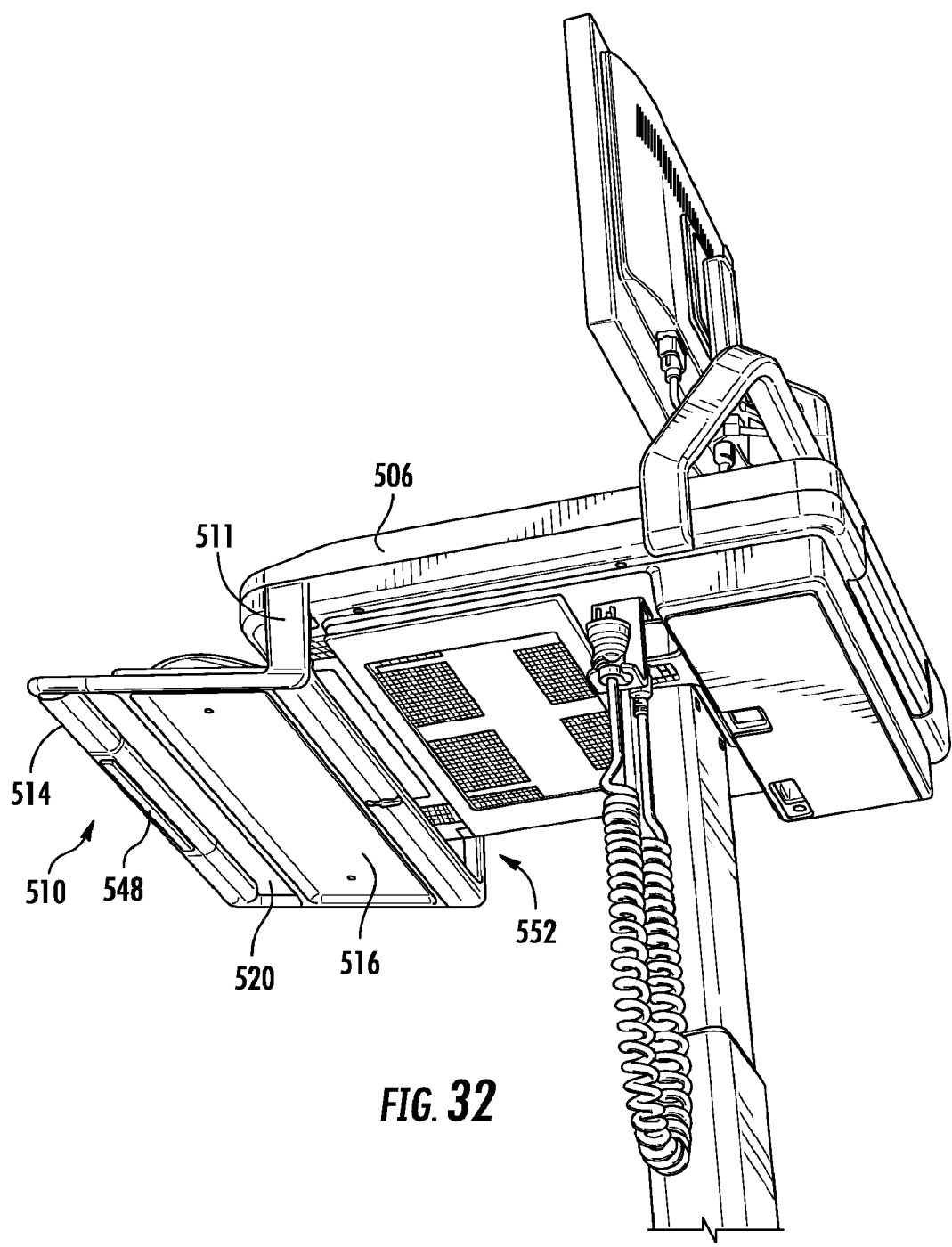
FIG. 32 is a partial, bottom perspective view of the accessory cart of FIGS. 30A to 30D.

FIG. 31 illustrates a perspective view of one drawer 606 configuration that can be incorporated in any of the described accessory carts.

FIGS. 33A through 33E show various additional accessories 614 and 616 that can be attached or installed on any accessory cart described herein.

FIG. 36 illustrates a cross-sectional view of the computer input device platform 150 assembled with the accessory cart 500. However, it should be noted again that the computer input device platform 150 can be used with any accessory cart embodiment described herein. As depicted, the computer input device platform 150 extends from the work surface 508 around the front of the cart 500 and terminates at an underside of the work platform 506. To secure the computer input device platform 150 to the cart 500, the first protrusion 159 is arranged in the first groove 550 and the second protrusion 158 is arranged in a second groove 552. The computer input device platform 150 can be arranged in the grooves 550, 552 by any known means, including, but not limited to, a snap-fit. Finally, FIGS. 37 and 38 illustrate various views the computer input device platform 150 described in detail above.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention.

We claim:

1. An accessory cart, comprising:
a base;
an adjustable housing element connected to the base, the housing element extending upward from the base; a work platform connected to the housing element,
the cart further comprising an input device, the input device configured to receive a user identifier, the user identifier being associated with a user height;
said accessory cart having stored thereon a series of predetermined heights, each of the stored predetermined heights being associated with at least one user height,
whereby said accessory cart is further configured to receive a user identifier from the input device and to adjust the housing element, using automatic non-manual means, to position the housing element at the predetermined height associated with the user height that is associated with the received user identifier.

2. The accessory cart of claim 1 where the user height is a height for a standing user.

3. The accessory cart of claim 1 where the user height is a height for a sitting user.

4. The accessory cart of claim 1 further comprising a series of casters attached to the base, and a tracking wheel attached near the center of the base.

5. The accessory cart of claim 1 where the input device comprises a wireless communication device adapted to wirelessly receive the user identifier.

6. The accessory cart of claim 1 wherein the user identifier comprises a user height.

7. The accessory cart of claim 1 wherein the user identifier comprises a user login identifier.

8. The accessory cart of claim 1 wherein the user identifier comprises an access identifier.

9. A method of adjusting a height of a platform of an accessory cart, said accessory cart comprising a base, an adjustable housing element connected to the base, and a work platform connected to the housing element,
the accessory cart further comprising an input device, a computer processor and computer memory;
said computer memory having stored thereon a series of predetermined positions and user identifiers, each user identifier associated with at least one user height,
each of said series of predetermined positions being associated with at least one user height,
said method comprising the steps of:
said processor receiving a specified user identifier from the input device, where the user identifier is associated with a predetermined position;
said processor receiving, from the computer memory, the specific predetermined position associated with the user identifier; and
using the specific predetermined position to move the adjustable housing element by automatic non-manual means to thereby move the work surface to a height associated with the specific user's user height.

10. The method of claim 9 where the predetermined position is associated with the height of a standing user.

11. The method of claim 9 where the predetermined position is associated with the height for a sitting user.

12. The method of claim 9 wherein the accessory cart further comprises a monitor positioned above the worksurface.

13. The method of claim 9 where the input device comprises a wireless communication device adapted to wirelessly receive the user identifier.

14. The method of claim 9 wherein the user identifier is a user height.

15. The method of claim 9 wherein the user identifier is a user login identifier.

16. The method of claim 9 wherein the identifier is an access identifier.

17. An accessory cart, comprising:
a base;
an automatically height-adjustable housing element connected to the base, said housing element extending upward from the base;
a work platform connected to said housing element,
said accessory cart further comprising
a computer processor and computer memory, and an input device, the input device configured to receive a user identifier, where the user identifier is associated with a predetermined ergonomic height of the work platform stored in said computer memory based on the user's height;
whereby said accessory cart is
further configured to receive a user identifier from said input device and to automatically adjust said housing element to position said work platform at the predetermined ergonomic height.

18. The accessory cart of claim 17 further comprising an electronic access card readable by the input device, where the electronic access card has stored thereon one of said user identifiers.

19. The accessory cart of claim 18 wherein the electronic access card is wirelessly readable by said input device.

20. The accessory cart of claim 17 wherein said association between said user identity and the predetermined ergonomic height of the work platform is contained in a database in said computer memory.

21. The accessory cart of claim 18 wherein said association between said user identifier and the predetermined ergonomic height of the work platform is stored in said access card.

22. An accessory cart, comprising:
a) a base;
b) a height-adjustable housing element extending upward from the base;
c) a work platform connected to the height-adjustable housing element; and
d) an automatic height adjustment mechanism operatively connected to the work platform for automatically adjusting a height of the work platform, the automatic height adjustment mechanism comprising an input device; a computer communicatively coupled to the input device; and a motorized lift operatively coupled to the computer;
wherein the input device is configured to receive a user identifier from the input device, said user identifier having height information of a user associated therewith, and wherein the computer is configured to communicate with the motorized lift to cause the height of the work platform to automatically adjust to a predetermined height associated with the height information of the user.

23. The accessory cart of claim 20 wherein said computer memory is located remotely from said base, said housing and said work platform.

24. The accessory cart of claim 17 wherein the predetermined ergonomic height of the work platform is based on the user's standing height.

25. The accessory cart of claim 17 wherein the predetermined ergonomic height of the work platform is based on the user's seated height.

26. The accessory cart of claim 17 wherein the predetermined ergonomic height of the work platform is selectable between the user's standing height and the user's seated height.

27. The accessory cart of claim 22 wherein said input device is a control panel.

* * * * *